(12) United States Patent
Jacob et al.

(10) Patent No.: US 11,893,644 B2
(45) Date of Patent: Feb. 6, 2024

(54) INTELLIGENT USER INTERFACE MONITORING AND ALERT

(71) Applicant: State Farm Mutual Automobile Insurance Company, Bloomington, IL (US)

(72) Inventors: Michael Shawn Jacob, LeRoy, IL (US); Benjamin D. Schappaugh, Bloomington, IL (US); William Guthrie, Mesa, AZ (US); Frank Matthew McCully, Hudson, IL (US); Timothy J. Nickel, Bloomington, IL (US); Brian W. Batronis, Gilbert, AZ (US); Robert D. Rariden, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 280 days.

(21) Appl. No.: 17/501,259

(22) Filed: Oct. 14, 2021

(65) Prior Publication Data
US 2022/0122183 A1 Apr. 21, 2022

Related U.S. Application Data

(60) Provisional application No. 63/092,144, filed on Oct. 15, 2020.

(51) Int. Cl.
*G06Q 40/08* (2012.01)
*G06N 20/00* (2019.01)
*H04L 67/50* (2022.01)

(52) U.S. Cl.
CPC ............. *G06Q 40/08* (2013.01); *G06N 20/00* (2019.01); *H04L 67/535* (2022.05)

(58) Field of Classification Search
CPC ............... H04L 67/535; G06F 3/04895; G06F 11/0751; G06F 11/0793; G06F 11/302;
(Continued)

(56) References Cited

U.S. PATENT DOCUMENTS 6,212,649 B1 * 4/2001 Yalowitz ............. G06F 11/1479
709/201
7,856,575 B2  12/2010 Bock et al.
(Continued)

FOREIGN PATENT DOCUMENTS

WO  WO 01/17169  3/2001

OTHER PUBLICATIONS

Office Action for U.S. Appl. No. 17/501,231, dated Feb. 2, 2023, Jacob, "Intelligent Error Monitoring and Alert", 15 Pages.

*Primary Examiner* — Benjamin M Thieu
(74) *Attorney, Agent, or Firm* — Lee & Hayes, P.C.

(57) ABSTRACT

Techniques for providing recommendations of actions for a user to perform to improve efficiency in user interactions with a user interface of a user computing device. An intelligent monitoring (IM) computing system may receive data from a user computing device and may determine user interactions associated with the user interface. The user interactions may include selections, an order associated with the selections, times associated with the selections, and/or other data corresponding to user interaction with a user interface. The IM computing device may be configured to determine a fault (e.g., inefficiency) associated with the user interactions and determine an action for the user to perform to correct the fault. The IM computing device may cause a notification including the action to surface on a display of the user computing device, such as to inform the user of a means by which they can improve efficiency of the user interactions.

20 Claims, 9 Drawing Sheets

(58) Field of Classification Search
CPC ... G06F 11/323; G06F 11/3438; G06Q 40/08; G06N 20/00
See application file for complete search history.

(56) References Cited

U.S. PATENT DOCUMENTS

| | | |
|---|---|---|
| 8,543,280 B2 | 9/2013 | Ghimire et al. |
| 9,401,991 B2 | 7/2016 | Hamlin et al. |
| 9,652,318 B2 | 5/2017 | Namkoong et al. |
| 10,108,480 B2 | 10/2018 | Parra |
| 10,121,157 B2 | 11/2018 | Agarwal et al. |
| 10,346,756 B2 | 7/2019 | Kirk et al. |
| 10,438,124 B2 | 10/2019 | Kirk |
| 10,621,003 B2 | 4/2020 | Valecha |
| 10,664,777 B2 | 5/2020 | Volkov et al. |
| 10,761,926 B2 | 9/2020 | Chien |
| 10,783,711 B2 | 9/2020 | Sun et al. |
| 10,872,160 B2 | 12/2020 | AthuluruTIrumala |
| 10,891,571 B2 | 1/2021 | Relangi |
| 2004/0010733 A1 | 1/2004 | S et al. |
| 2007/0234224 A1 | 10/2007 | Eavitt et al. |
| 2014/0129285 A1 | 5/2014 | Wu et al. |
| 2014/0163907 A1 | 6/2014 | Alley et al. |
| 2014/0207506 A1 | 7/2014 | Palmert et al. |
| 2014/0222521 A1 | 8/2014 | Chait |
| 2014/0257835 A1 | 9/2014 | Kashyap |
| 2014/0278640 A1 | 9/2014 | Galloway et al. |
| 2015/0249512 A1 | 9/2015 | Adimatyam et al. |
| 2017/0132068 A1 | 5/2017 | Parra |
| 2017/0344895 A1 | 11/2017 | Roy |
| 2018/0025084 A1 | 1/2018 | Conlan et al. |
| 2018/0032386 A1 | 2/2018 | DeChiaro |
| 2019/0114572 A1 | 4/2019 | Gold et al. |
| 2020/0084119 A1 | 3/2020 | Zackariya et al. |
| 2020/0128555 A1 | 4/2020 | Kreiner et al. |
| 2020/0167258 A1 | 5/2020 | Chattopadhyay et al. |
| 2020/0334123 A1 | 10/2020 | Chatterjee et al. |
| 2021/0042180 A1 | 2/2021 | Sutton et al. |
| 2021/0173756 A1 | 6/2021 | Yoon et al. |
| 2021/0374569 A1* | 12/2021 | Jezewski ............... G06N 20/00 |
| 2022/0036259 A1 | 2/2022 | Bird |
| 2022/0121509 A1 | 4/2022 | Jacob et al. |

\* cited by examiner

INTELLIGENT USER INTERFACE MONITORING AND ALERT

RELATED APPLICATIONS

This Patent Application is a nonprovisional of and claims priority to U.S. Provisional Patent Application No. 63/092,144, entitled "INTELLIGENT USER INTERFACE MONITORING AND ALERT," filed on Oct. 15, 2020, the entirety of which is incorporated herein by reference.

BACKGROUND

Collaboration across multiple disparate computing systems and platforms is becoming increasingly common in business. Often, a particular business will utilize services provided by external computing platforms and/or applications, as well as in-house computing platforms and/or applications, to conduct business, such as to provide a service to a customer. For example, a business may utilize local, company-owned applications, combined with an application platform as a service (aPaaS), to provide a service to a customer. By outsourcing at least a portion of the service provided to the customer, the particular business may more effectively and efficiently complete tasks for the customer. However, accessing a plurality of disparate applications can increase complexity for an agent to complete a particular task for the customer, thereby increasing a probability of encountering an error while providing the service to the customer. For example, to generate a quote for an insurance policy for a customer, an agent may access seven disparate applications. If the agent does not access the applications in a particular order, the speed at which the agent may provide the service to the customer may be affected.

Additionally, to complete the particular task, the agent may complete one or more different steps in each of the disparate applications. An order in which the agent completes the one or more different steps may additionally affect the speed at which the agent may provide the service to the customer. However, the agent may not be aware that there may be more efficient methods of accessing the applications and/or completing the one or more different steps associated with the applications. As such, in some situations, improving efficiency of operation may require a significant amount of trial and error, which may be time and resource intensive. Further, it may not be possible, with little to no insight into other agent actions with respect to the disparate applications, for the agent to identify methods for increasing efficiency.

Examples of the present disclosure are directed toward overcoming the deficiencies noted above, as well as other deficiencies.

SUMMARY

This disclosure is directed to an intelligent user interface monitoring and alert system configured to identify faults associated with a user interaction with a user interface. In various examples, the faults may represent inefficiencies related to the user's interaction with the user interface. In some examples, the faults may represent inefficiencies associated with user interaction with an application of a plurality of applications associated with a collaborative computing system ("collaborative system").

The collaborative system may include a plurality of computing devices configured to communicate with one another via one or more networks. The plurality of computing devices may include computing devices that are managed by one or more disparate entities (e.g., businesses, companies, organizations, etc.) and/or located in geographically separated locations. In at least one example, the plurality of computing devices may each include at least one application that may be accessed by a user to perform a service for a customer. For example, the user may be an insurance agent. The insurance agent may access multiple disparate applications managed by multiple disparate entities in order to provide an insurance quote to the customer.

The intelligent user interface monitoring and alert system may receive event data from a user computing device associated with a user. The event data may include one or more selections, an order associated with the selection(s), times associated with the selection(s), and/or other data corresponding to user interaction with a user interface associated with the user computing device. The intelligent user interface monitoring and alert system may analyze the event data to determine whether a fault is associated with the user interaction. Based on a determination that a fault is associated with the user interaction, the intelligent user interface monitoring and alert system may determine an action for the user to perform to optimize efficiency of user interactions with the user interface. In various examples, the intelligent user interface monitoring and alert system may cause a recommendation including the action to be presented on a display of the user computing device.

In various examples, a computing system may receive, from a computing device associated with a user, event data corresponding to a user interaction with a user interface of the computing device. The computing system may determine whether an efficiency score based on the event data is less than a threshold score. The computing system may determine a fault corresponding to the user interaction with the user interface based on a determination that the efficiency score is less than the threshold score. The computing system may determine an action for the user to perform based at least in part on the fault and may cause a notification identifying the action to be presented on a display of the user computing device.

In some examples, a method includes receiving, from a user computing device, event data corresponding to a user interaction with a user interface of the computing device. The method may further include determining whether an efficiency score based on the event data is less than a threshold score. The method may further include determining, based on determining that the efficiency score is less than the threshold score, a fault corresponding to the user interaction with the user interface. The method may further include determining an action for the user to perform based at least in part on the fault and causing a notification identifying the action to be presented on a display of the user computing device.

In some examples, a non-transitory computer readable medium may be configured to receive, from a computing device associated with a user, event data corresponding to user interactions with a user interface of the computing device. The non-transitory computer readable medium may identify, based at least in part on the event data, a fault corresponding to the user interactions with the user interface. The non-transitory computer readable medium may further determine that the fault is associated with a first user interaction of the user interactions, the first user interaction being with an application of a plurality of applications associated with the user interface. The non-transitory computer readable medium may further determine an action for the user to perform in association with the application based at least in part on the fault. The non-transitory computer readable medium may further cause a notification identifying the action to be presented on a display associated with the computing device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1:
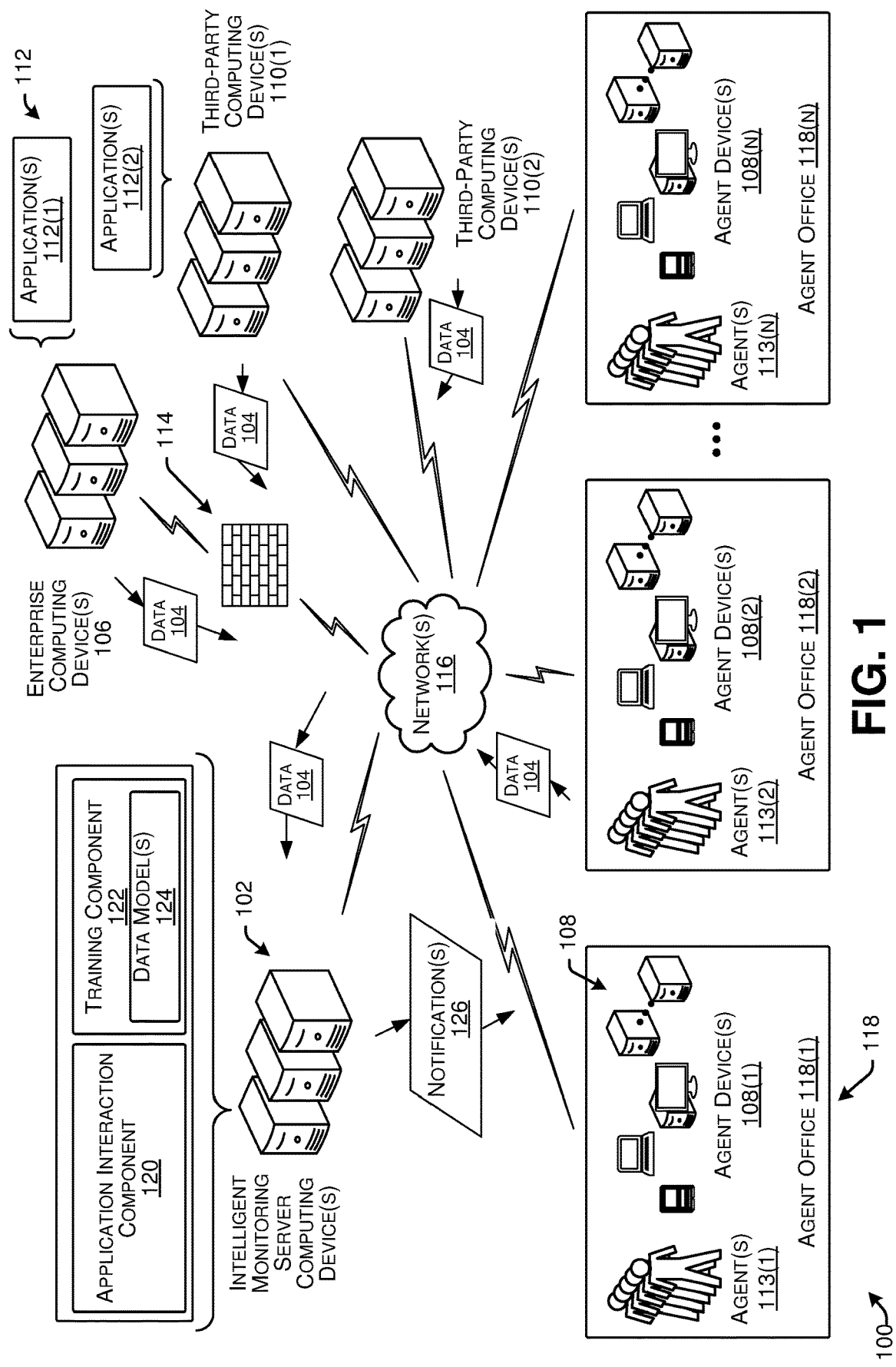
FIG. 1 illustrates an example collaborative computing system in which an intelligent user interface monitoring and alert system may be used to identify a fault.

FIG. 1 illustrates a collaborative computing system 100 (system 100) that includes one or more intelligent monitoring (IM) server computing device(s) 102 (e.g., IM computing device(s) 102) configured to receive data 104 (e.g., event data) from a plurality of disparate computing devices and to determine one or more inefficiencies (e.g., faults) of user interaction with the collaborative computing system 100 based on the data 104, as described herein.

In various examples, the collaborative computing system 100 ("collaborative system") may include one or more computing resources associated with an organization of the IM server computing device(s) 102, such as one or more enterprise computing device(s) 106 and/or agent device(s) 108. In some examples, the collaborative system may include one or more computing resources associated with a different organization from the organization of the IM server computing device(s) 102, such as one or more third-party computing devices 110. The computing devices of the collaborative system 100 (e.g., IM server computing device(s) 102, enterprise computing device(s) 106, agent device(s) 108, and/or third-party computing device(s) 110) may each include one or more applications 112 accessible by the agent device(s) 108 in order to provide services to a customer. For example, the collaborative system 100 may be associated with an insurance provider, which operates to provide multiple services to customers. An agent 113 operating an agent device may provide a service to a customer utilizing data provided by utilizing applications 112 associated with the enterprise computing device(s) 106 and/or third-party computing device(s) 110. The IM server computing device(s) 102 may monitor the data 104 including user interactions with a user interface usable to access the applications 112 to ensure that the agent 113 optimizes efficiencies in providing the service (e.g., minimize time associated with a service, minimize data transferred to perform the service, minimize processing power of the agent device(s) 108 to perform the service, etc.).

The third-party computing devices 110 may include computing devices associated with a public cloud, a platform as a service, software as a service, infrastructure as a service, third-party applications 112(2) (e.g., web-based and/or native applications managed by a third-party), and the like. The enterprise computing device(s) 106 may include computing devices associated with on-premise enterprise applications 112, such as application(s) 112(1), an enterprise private cloud or other data centers, or the like. In some examples, the data 104 transmitted between the enterprise computing device(s) 106 and the IM computing device(s) 102, and/or third-party computing device(s) 110 and the IM computing device(s) 102 may traverse a firewall 114. The firewall 114 may include hardware and/or software configured to filter the data 104 transmitted to and from a computing device, such as the enterprise computing device(s) 106. In various examples, the firewall 114 may have associated therewith one or more filter rules that govern the filtration of the data 104 transmitted between the respective computing device and other computing devices via network(s) 116, such as the data 104 transmitted between an enterprise computing device 106 and the agent device(s) 108.

The agent device(s) 108 may include computing devices associated with one or more agent offices 118. The agent office(s) 118 and/or the agent device(s) 108 may be geographically dispersed from one another. For example, a first agent office 118(1) may be physically located in Bloomington, Illinois, while a second agent office 118(2) may be physically located in Seattle, Washington. For another example, a first agent device 108(1) associated with a first agent office 118(1) may be located in New York City while a second agent device 108(2) associated with the first agent office 118(1) may be located in Rochester, New York. While discussed herein as being associated with a particular agent office 118, the agent device(s) 108 may include mobile devices, stationary devices, server devices, and/or any other type of computing device.

In at least one example, the enterprise computing device(s) 106 and the agent device(s) 108 may be associated with a single organization configured to provide insurance (e.g., automobile, life, property, small business etc.), banking (e.g., loans, savings, checking, etc.), and/or other services. In various examples, for an agent 113 associated with an agent office 118 to complete a task, such as to generate an insurance quote for a particular customer, the agent 113 may have to utilize a plurality of applications 112 on an associated agent device 108 and/or access a plurality of data stored on disparate, geographically separated computing devices (e.g., different agent device(s) 108, enterprise computing device(s) 106, third-party computing device(s) 110, etc.).

The different applications 112 may include custom built applications (e.g., by an organization associated with the IM computing device(s) 102), vendor provided applications, applications hosted (e.g., managed) by the organization associated with the IM computing device(s) 102, and/or applications hosted on a vendor computing device (e.g., third-party computing device(s) 110). The collaborative system may include two or more applications 112 created and/or hosted by two or more different organizations. For example, the agent 113 may access information associated with a first application of the plurality of applications 112 that is managed by the enterprise computing device(s) 106, a second application that is managed by a first third-party computing device(s) 110(1), a third application that is managed by a second third-party computing device(s) 110(2), and so on. Due in part to the complexity of the collaborative system (e.g., including the plurality of computing devices, networks, firewalls, etc.), inefficiencies in the agent 113 switching between different applications 112 and/or a series of agent interactions with respect to a particular application 112, such as application 112(1), can compound and result in the agent 113 spending an inordinate amount of time providing a service, while also wasting computing resources, such as additional processing power transferring between applications and/or performing unnecessary steps in a single application 112. The IM computing device(s) 102 may be configured to analyze the data 104 received from the plurality of disparate computing devices (e.g., agent device(s) 108, the enterprise computing device(s) 106, the third-party computing device(s) 110) to determine one or more faults (e.g., inefficiencies, erroneous selections, etc.) with user interaction with a user interface associated with the collaborative system. An analysis of the data 104 may include determining a time between user inputs (e.g., selections, clicks, etc.), an order of user inputs, one or more irrelevant selections for a service and/or function to be performed, a number of attempts required to receive relevant results, a total time associated with performing a service and/or function, a time associated with user interactions with a particular application, a number of user input associated with a particular application, and the like.

In various examples, the agent device(s) 108, the enterprise computing device(s) 106, the third-party computing device(s) 110, and the IM computing device(s) 102 may be identified by one or more discrete identifiers (e.g., numbers, letters, symbols, etc.). In some examples, the identifiers may include organization identifiers (e.g., owner of the device, manager of the device, etc.), user identifier (e.g., identifier of a user associated with the device, agent identifier, etc.), internet-protocol addresses, role of the device (e.g., client device, server device, etc.), or the like. In some examples, a particular computing device may have associated therewith at least one discrete identifier by which the particular computing device may be identified, such as by the IM computing device(s) 102. For example, an agent computing device 108 may include a first identifier associated with the agent 113 corresponding thereto, a second identifier associated with the agent office 118 corresponding thereto, and a third identifier associated with an organization (e.g., a particular company) corresponding thereto.

In various examples, the agent device(s) 108, the enterprise computing devices 106, the third-party computing devices 110, and the IM computing device(s) 102 may include a variety of device types configured to communicate via the network(s) 116 and are not limited to a particular type of device. In some examples, device types may include stationary devices, including but not limited to servers, desktop computers, personal computers, workstations, and thin clients, such as those capable of operating in the distributed computing resource. In at least one example, the one or more IM computing devices 102 may be configured to communicate with one another via a distributed computing resource. In some examples, the IM computing device(s) 102, the enterprise computing devices 106, the agent device(s) 108, and the third-party computing devices 110 may include mobile devices, including but not limited to mobile phones, tablet computers, laptop computers, and any other mobile computers or mobile telecommunication devices. In various examples, the IM computing device(s) 102, the enterprise computing devices 106, the agent device(s) 108, and the third-party computing devices 110 may include any other sort of computing device configured to communicate via the network(s) 116.

In various examples, the network(s) 116 may include public networks such as the internet, private networks such as an institutional and/or personal network or some combination of public and private networks. The network(s) 116 may also include any type of wired and/or wireless network, including but not limited to local area networks (LAN), wide area networks (WAN), satellite networks, cable networks, Wi-Fi networks, WiMax networks, mobile communications networks (e.g., 3G, 4G, 5G, etc.), or any combination thereof. The network(s) 116 may utilize communications protocols, including packet-based and/or datagram-based protocols, such as internet protocol (IP), transmission control protocol (TCP), user datagram protocol (UDP), or other types of protocols. Moreover, the network(s) 116 may also include a number of devices that facilitate network communications and/or form a hardware basis for the networks, such as switches, routers, gateway access points, firewalls, base stations, repeaters, backbone devices, and the like.

In some examples, the network(s) 116 may further include devices that can enable connection to a wireless network, such as a wireless access point (WAP). The examples which support connectivity through WAPs send and receive data over various electromagnetic frequencies (e.g., radio frequencies), including WAPs that support Institute of Electrical and Electronics Engineers (IEEE) 802.11 standards (e.g., 802.11g, 802.11n, and so forth) and other standards.

In some examples, the data 104 may include real-time data and/or near real-time data. In some examples, the IM computing device(s) 102 may be configured to receive the data 104 in a plurality of streams of data. In some examples, each computing resource, such as a particular enterprise computing device 106, may send the data 104 in a data stream to the IM computing device(s) 102. The data 104 associated with a particular data stream may be generated by the respective computing device (e.g., an enterprise computing device 106, an agent device 108, a third-party computing device 110, etc.). For example, an agent device 108(N) associated with an agent 113(N) may send data including user interactions with a user interface real-time and/or near real-time to the IM computing device(s) 102, such as when the agent 113(N) is interacting with the user interface.

In various examples, the IM computing device(s) 102 may receive the data 104 from the enterprise computing device(s) 106, the agent device(s) 108, and/or the third-party computing device(s) 110 via the network(s) 116. In various examples, the IM computing device(s) 102 may receive the data in packets of data. In such examples, the respective computing device (e.g., the enterprise computing devices 106, the agent device(s) 108, and/or the third-party computing devices 110) may store data for a period of time and send the stored data 104 as a packet of data. For example, an agent device 108(2) associated with an agent 113(2) may send the data 104 including user interactions with a user interface after a service is complete, such as when the agent 113(2) submits a request for an insurance quote and/or when the insurance quote is provided to the customer.

In some examples, the data 104 may be sent intermittently, such as when an event occurs and/or when a user of an associated device inputs the data 104. In some examples, the enterprise computing device(s) 106, the agent device(s) 108, and/or the third-party computing device(s) 110 may send the data 104 to the IM computing device(s) 102 periodically (e.g., every minute, hourly, daily, weekly, etc.). In such examples, the data 104 may include information processed (e.g., gathered, generated, stored, etc.) by the associated computing devices throughout the periodic interval. For example, an agent computing device 108(2) associated with an agent 113(2) may send a daily report of user interactions with the user interface, such as after a close of business at an agent office 118(2). The daily report may include relevant information about each service provided during the day and associated user interaction data with each service provided.

In various examples, the data 104 received from the agent device(s) 108 may include event data. The event data may include data associated with agent 113 (e.g., user) interactions with a user interface corresponding to the agent device 108. The event data may include selections (e.g., clicks), a series (e.g., order) of selections within a particular application 112 (e.g., managed by a computing device of the collaborative system 100), a number of selections associated with the particular application 112, a series of accessing different applications 112 while performing a service, a time the agent spends in the particular application 112, a time associated with each selection in the particular application 112, a time between selections, a total time associated with performing the service, and the like. For example, an agent 113(1) associated with agent computing device 108(1) may be providing a service for a customer, such as generating a quote for an insurance policy. The agent 113(1) may access a user interface on the agent computing device 108(1) via which the agent 113(1) may interact with five applications 112 managed by different computing devices of the collaborative system 100 (e.g., three applications managed by the enterprise computing device(s) 106, one application managed by the first third-party computing device 110(1) and one application managed by the second third-party computing device 110(2)). The IM computing device(s) 102 may receive the data 104 (e.g., event data) from the agent computing device 108(1) including each interaction of the agent 113(1) with each application.

Additionally, the data 104 may include information processed (e.g., gathered, generated, stored, etc.) by the associated computing devices either in real-time and/or near real-time, and/or over an interval of time. For example, the data 104 received from an enterprise computing device 106 may include data gathered in response to a request from an agent computing device 108 via a user interaction. In some examples, the data 104 may include times associated with performing functions (e.g., processing data) requested by an agent 113, such as in an order to provide a service to a customer.

The IM computing device(s) 102 may receive the data 104 from the agent device(s) 108, the enterprise computing device(s) 106, and/or the third-party computing device(s) 110. An application interaction component 120 of the IM computing device(s) 102 may analyze the data 104 to determine one or more faults associated with user interaction with one or more applications 112 associated with the collaborative system 100. An analysis of the data 104 may include determining a time between user inputs (e.g., selections, clicks, etc.), an order of user inputs, one or more irrelevant selections for a service and/or function to be performed, a number of attempts required to receive relevant results, a total time associated with performing a service and/or function, a time associated with user interactions with a particular application, a number of user input associated with a particular application, and the like.

In some examples, the application interaction component 120 may determine a particular application of the one or more applications 112 that corresponds to the fault(s). For example, an agent 113(1) may perform a service for a customer that involves the agent 113(1) accessing three different applications 112 managed by three different computing systems via an agent device 108(1). The application interaction component 120 may receive the data 104 including user interactions (e.g., event data) with each of the three different applications. The application interaction component 120 may determine that a series of interactions with a second application is not an efficient series of interactions with the second application (e.g., the agent 113(1) selects and/or inputs data in an inefficient order, a total time associated with the series of interactions exceeds a threshold time, the agent 113(1) selects irrelevant selectable options associated with the application, etc.). The application interaction component 120 may analyze the data 104 received from the agent device 108(1) to determine that a fault exists with the second application. As such, the application interaction component 120 may identify efficiencies in the agent 113(1) interactions with the user interface, and may determine suggested actions for the agent 113(1) to take to improve efficiency in the user interaction. A resulting improved efficiency may improve the functioning of the agent device by reducing a total amount of inputs to perform a service and/or a function, a total time associated with the service and/or function, and the like. The resulting improved efficiency may additionally improve the collaborative computing system 100 as a whole, as data flow in the performance of the service and/or function is faster and results in fewer irrelevant user inputs and/or data transmitted between associated computing devices of the collaborative computing system.

In various examples, the application interaction component 120 may receive the data 104 from an agent device 108 and may generate an efficiency score associated therewith. In some examples, the efficiency score may be determined based on a particular service the agent 113 is providing, a particular application 112 the agent is accessing, a function the agent 113 is performing with regard to a particular application, or the like. Continuing the example from above, the application interaction component 120 may determine that the user interaction with a first application includes a first efficiency score (e.g., 90%, 0.9, 90 etc.), user interaction with a second application includes a second efficiency score (e.g., 50%, 0.5, 50, etc.) and user interaction with a third application includes a third efficiency score (e.g., 89%, 0.89, 89, etc.).

In some examples, the efficiency score can be determined based on historical data associated with a plurality of agent devices 108 (e.g., a plurality of data received from the plurality of agent devices 108). In such examples, the application interaction component 120 can compare current user interactions with previous user interactions (e.g., historical data) to determine the efficiency score. In various examples, a comparison may include comparing times associated with user interactions (e.g., total time, time associated with interaction with an application, etc.) to times associated with the previous user interactions, a number of selections associated with the user interaction compared to a previous number of selections associated with the previous user interactions, an order of selections associated with the user interaction compared to a previous order of selections associated with the previous user interactions, and the like. For example, times associated with previous user interactions (e.g., from historical data) may be characterized by a measurement of an average time, a median time, or a time corresponding to a specific percentile. The corresponding measurement (e.g., an average time) may be computed for the current user interactions. The efficiency score may be computed as the measurement for the current user interactions divided by the measurement associated with the previous user interactions, expressed as a fraction or percentage. Similarly, the efficiency score based on a number of selections may be computed by dividing the average or median number of selections associated with the current user interactions by the average or median number of selections associated with previous user interactions, expressed as a fraction or percentage. Non-numerical measurements such as the order of selections may be compared using edit distance (e.g., Levenshtein distance, Hamming distance etc.), and the efficiency score may be based on the number of edits required. In some examples, the efficiency score may include an overall score for the current user interactions, computed as a weighted average of the efficiency scores obtained based on multiple types of data, such as times, number of selections, and the like. The weights may be indicative of an importance of the measurement. For example, in some instances, the total time taken may be of higher importance than the number of selections, and therefore, the efficiency based on total time is assigned a greater weight than the efficiency based on the number of selections. The multiple types of data used for computing the efficiency score may be included in the event data associated with agent 113 (e.g., user) interactions with a user interface. Statistical modeling and data analysis techniques may be used to generate data model(s) of the multiple types of data in the previous user interactions. Measurements from the current user interactions may be compared against the generated data model(s) to determine the efficiency score e.g., based on the percentile range of the current user interactions in the distribution of measurements of the data model(s).

In some examples, the application interaction component 120 can determine the efficiency score based on a comparison of event data associated with a current user interaction to historical data of user interactions via the user interface associated with a plurality of agents. In some examples, the application interaction component 120 can determine the efficiency score based on a comparison of event data associated with the current user interaction to previous user interactions associated with the particular agent 113. In some examples, the application interaction component 120 can determine, based on an analysis of a current user interaction to historical data associated with the particular agent 113, that the current user interaction includes an anomaly in time, order of selections, number of selections, etc. In such examples, the application interaction component 120 may determine to ignore the current connection session, such as by not determining a fault and/or identifying an action to perform. For example, a particular agent 113(2) may input selections via a user interface while performing a service for a customer. The current user interaction while performing the service may include a time between user inputs on a particular application that is above a threshold time. The application interaction component 120 may access historical data associated with the agent 113(2) to determine that an average time between user inputs with the particular application is less than the time. Accordingly, the application interaction component 120 may determine that the longer time between user inputs is an anomaly and not a fault associated with the user interaction.

In various examples, the application interaction component 120 can determine one or more patterns associated with user interactions with the user interface and/or applications 112. In some examples, the pattern(s) can include a series of user inputs via the user interface, a total number of user inputs received via the user interface and in association with event data, a time between a first user input and a second user input (e.g., time between selections), a total time associated with event data, a number of applications 112 accessed in association with event data, a number of transitions between applications 112, a series of transitions between applications, and/or a number of user inputs corresponding to a function of the user interface. In some examples, the efficiency score can be based on the pattern(s) of user interactions, such as to perform a service for a customer or the like.

In various examples, the application interaction component 120 can determine one or more patterns associated with different agent interactions over time and can identify one or more enabling patterns and/or one or more inhibiting patterns. The enabling patterns may include patterns of user interactions that represent efficient operations with respect to a user interface and/or application 112. The inhibiting patterns may include patterns of user interactions that represent inefficient operations with respect to the user interface and/or application 112. In some examples, the application interaction component 120 may identify the enabling patterns and/or inhibiting patterns based on a comparison of the efficiency scores associated therewith. For example, the application interaction component 120 may determine a first pattern associated with a first agent 113(1) performing a service and/or function for a first customer and a second pattern associated with a second agent 113(2) performing the same service and/or function for a second customer. The application interaction component 120 may determine a first efficiency score associated with the first pattern and a second efficiency score associated with the second pattern. The application interaction component 120 may determine that the first efficiency score is greater than the second efficiency score and based on the determination, may identify the first pattern as an enabling pattern.

In various examples, the application interaction component 120 may be configured to determine an optimized pattern of user interaction for performing a particular service and/or function via the user interface. The optimized pattern may include a most efficient (e.g., highest efficiency score) and/or profitable pattern (e.g., least amount of total time to perform a service and/or function) of user interaction to perform the particular service and/or function. In at least one example, the optimized pattern may additionally be classified as an enabling pattern, the enabling pattern being an efficient pattern corresponding to the user interactions. In various examples, the optimized pattern may include a pattern of user interaction associated with a fastest time, a minimal number of transitions between applications 112, a minimal number of selections in each application 112, and/or other optimized actions associated with performing a service and/or function.

In various examples, an efficiency score associated with user interaction may be determined based at least in part on the optimized pattern of user interaction. In some examples, the application interaction component 120 may compare one or more characteristics (e.g., total time, time associated with an application, time between selections, number of selections, order of selections, etc.) associated with a current user interaction to one or more characteristics associated with the optimized pattern. For example, a current user interaction may include an average time between clicks associated with a particular application that is 85% as fast an average time between clicks associated with the optimized pattern. The efficiency score associated with the application and/or time between selections may be 85.

Based in part on the efficiency score, the application interaction component 120 may determine a fault associated with user interaction with a user interface and/or a particular application 112 accessed while performing a service and/or function for a customer. For example, an agent 113 may access three different applications 112 to perform a service for a customer. The application interaction component 120 may determine a first efficiency score associated with interactions with the first application, a second efficiency score associated with interactions with the second application and a third efficiency score associated with interactions with the third application. The application interaction component may determine, based on the first efficiency score being less than the second efficiency score and the third efficiency score, that a fault exists with respect to user interaction with the first application. In some examples, the application interaction component 120 may determine the fault based on a respective efficiency score being less than a threshold score (e.g., 75%, 0.75, 80, etc.). In such examples, the application interaction component 120 may determine that the fault exists based on a determination that the respective efficiency score is less than the threshold score. Continuing the example from above, the application interaction component 120 may determine that the first efficiency score is below a threshold score, while the second efficiency score and the third efficiency score are above the threshold score. Based on a determination that the first efficiency score is below the threshold score, the application interaction component 120 may determine a fault with respect to the user interaction with the first application.

In some examples, the application interaction component 120 may determine a fault associated with user interaction efficiencies based on one or more trends associated with a particular user. In some examples, the application interaction component 120 can be configured to identify the trend(s) associated with a particular agent based on different instances of user interactions while performing a particular service and/or function, such as those determined over time. In some examples, the application interaction component 120 may receive user interactions associated with the particular agent over time and may store the user interactions in a database, such as in an agent profile (e.g., user profile) associated with the particular agent. In some examples, the user interactions may be stored based on a time, a service provided, and/or a function performed associated therewith. In various examples, the application interaction component 120 may determine the trends based on the different instances of user interactions associated with a same or similar service provided and/or function performed. For example, an agent 113(N) may onboard (e.g., add) two, three, or more different clients into a system. The application interaction component 120 may receive three instances of user interactions with a user interface to onboard the three different clients. The application interaction component 120 may determine that a time between selections and/or inputs of data in each of the three instances, slows at a particular point in the onboarding process. The application interaction component 120 may determine the trend of slowing at the particular point is associated with the agent 113(N).

In various examples, the application interaction component 120 may determine one or more actions to take based on the fault. The action(s) may include a series of user inputs associated with the user interface (e.g., alternate order of selections, etc.) and/or a particular application 112, a series of applications 112 accessed to perform a service (e.g., alternate order of accessing applications), a suggested user input corresponding to a function of the user interface (e.g., input wildcard symbol associated with search function), and/or other actions designed to remedy faults associated with user interactions with a user interface. For example, the user interface may include a search function, configured to enable an agent 113 to search for and find customer information. The customer information may be stored (in a database) locally on an agent device 108 and/or on one or more enterprise computing device(s) 106. The agent 113 may input a first spelling of the customer name, which may result in a failed attempt to access the customer information. The agent 113 may input a second spelling of the customer name, which may also result in a failed attempt to access the customer information. The application interaction component 120 may receive the data 104 (event data) including the user interactions associated with searching for customer data and may determine an action for the customer to take to improve efficiency of the search (e.g., reduce a total time associated with the search, reduce a number of requests for data associated with the search, reduce an amount of data transmitted over a network to receive relevant results, etc.). For example, the action may include using a wildcard associated with the search function in a search to find customer information when an exact spelling of a customer name is not known.

In some examples, the application interaction component 120 may generate a notification 126 to provide to the agent 113, such as via an associated agent device 108, to alert the agent 113 of the fault and/or the action to take to improve efficiency (e.g., expedite performing a service and/or function, reduce data transmitted to perform the service and/or function, etc.). In some examples, the notification 126 may include a push notification, electronic mail, short message system message, or other notification system configured to alert a person of the fault and/or the action. For example, the application interaction component 120 may determine that an agent 113 performing a particular service for a customer is switching from a first application to a second application without completing the steps associated with the particular service in the first application. Due to the premature switch from the first application to the second application, the agent 113 is required to transition back to the first application to complete the steps prior to completing the service. The application interaction component 120 may cause a notification 126 including the fault (e.g., premature switch between applications) and the action (e.g., complete information in the first application prior to switching to improve efficiency) to surface on a display of the agent computing device 108, alerting the agent 113 of the fault and/or the action.

Additionally or in the alternative, the application interaction component 120 may generate a notification 126 to provide to an agent 113 based on agent data associated therewith, such as that stored in an agent profile. In various examples, the application interaction component 120 may receive the data 104 from an associated agent device 108 and may determine an experience level of the agent 113 (e.g., months/years of employment, number of times the agent 113 has performed a current service and/or function, a number of times the agent 113 has performed the current service and/or function within a threshold time period (e.g., last month, last year, etc.), etc.). In some examples, the application interaction component 120 may determine whether the experience level of the agent is below a threshold level. The threshold level may include a threshold number of years and/or months of employment, a number of times the agent 113 has performed the current service and/or function, a number of times performing the current service and/or function in the recent past. Based on a determination that the experience level of the agent is below the threshold level, the application interaction component 120 may generate one or more notifications 126 to assist the agent 113 in optimizing efficiency in user interactions.

In various examples, the IM computing device(s) 102 may include a training component 122 configured to determine the fault and/or the action(s) associated therewith. In some examples, the IM computing device(s) 102 may utilize machine learning techniques to train one or more data models 124 to identify the fault and/or the action(s). In such examples, the training component 122 may access fault data and/or actions stored in a database associated with the IM computing device(s) 102 and may process the data to train the data model(s) 124 to identify the fault and/or the action(s). As will be discussed in further detail below with regard to FIGS. 7-9, in such examples, the training component 122 may utilize machine learning techniques to train the data model(s) 124. Additionally, or in the alternative, the data model(s) 124 may utilize one or more statistical models for processing data and determining an outcome (e.g., a fault, an action, etc.).

Figure 2:
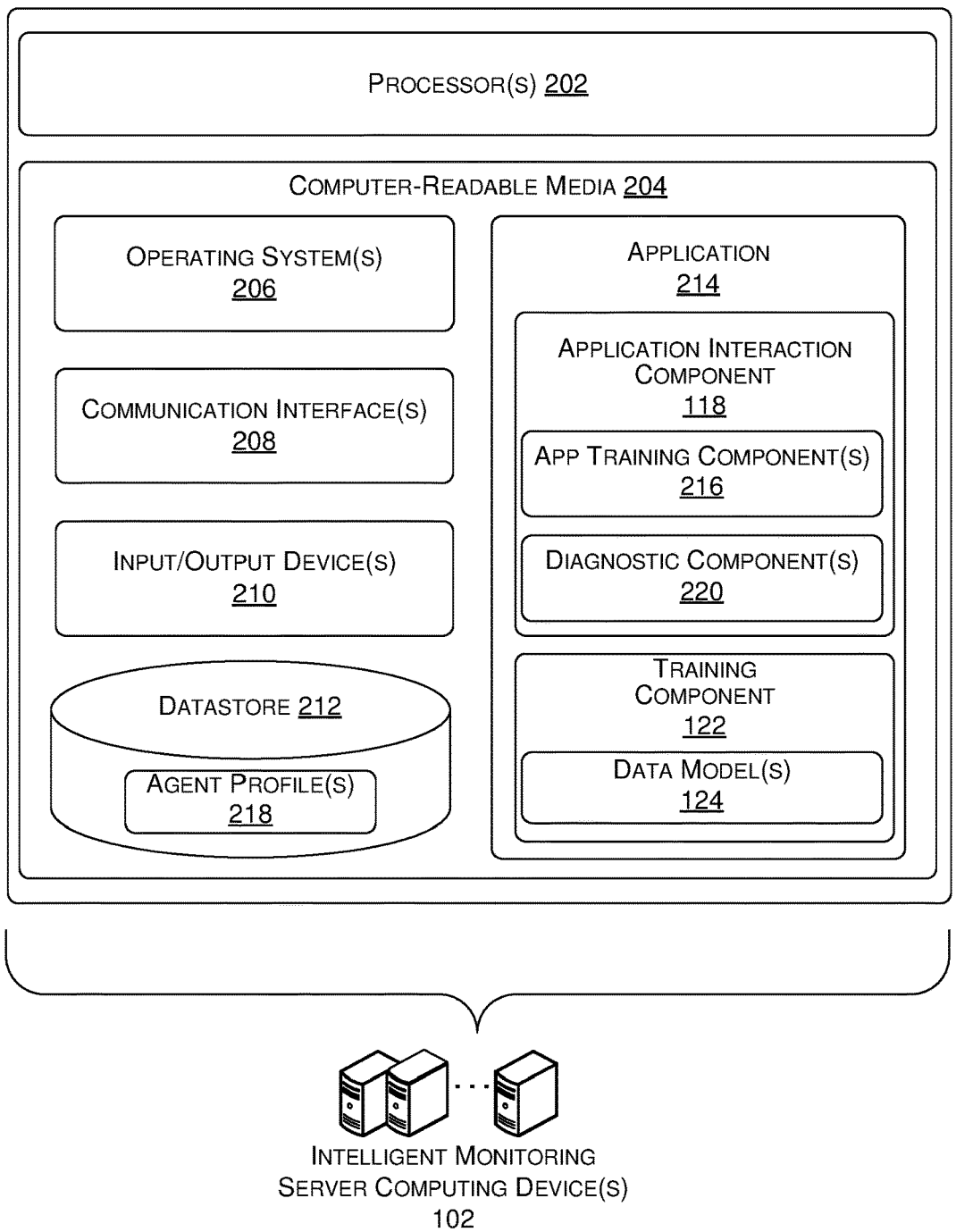
FIG. 2 illustrates an example intelligent monitoring server computing device for identifying a fault.

FIG. 2 is a block diagram of an illustrative computing architecture 200 of the IM computing device(s) 102. The computing architecture 200 may each be implemented in a distributed or non-distributed computing environment.

The computing architecture 200 may include one or more processors 202 and one or more computer-readable media 204 that stores various components, applications, programs, or other data. The computer-readable media 204 may include instructions that, when executed by the one or more processors 202, cause the processors to perform the operations described herein for the system 100.

The computer-readable media 204 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media appropriate for storing electronic instructions. In addition, in some examples the computer-readable media 204 may include a transitory computer-readable signal (in compressed or uncompressed form). Examples of computer-readable signals, whether modulated using a carrier or not, include, but are not limited to, signals that a computer system hosting or running a computer program may be configured to access, including signals downloaded through the Internet or other networks. The order in which the operations are described is not intended to be construed as a limitation, and any number of the described operations may be combined in any order and/or in parallel to implement the process. Furthermore, the operations described below may be implemented on a single device or multiple devices.

As shown in FIG. 2, in some configurations, the computer-readable media 204 may store an operating system 206, one or more communication interface(s) 208, one or more input/output (I/O) interface(s) 210, and a datastore 212, which are described in turn. The components may be stored together or in a distributed arrangement. The operating system 206 may enable control and management of various functions of the IM computing device(s) 102, as described herein.

The communication interface(s) 208 may include one or more interfaces and hardware components for enabling communication with various other devices, such as over the network(s) 116 or directly. For example, communication interface(s) 208 may enable communication through the network(s) 116, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, the network(s) 116 may include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The computing architecture 200 may further include the one or more I/O devices 210. The I/O device(s) 210 may include speakers, a microphone, a camera, and various user controls (e.g., buttons, a joystick, a keyboard, a keypad, etc.), a haptic output device, and so forth. In some examples, the I/O device(s) 210 may enable a user to input data and/or instructions to run automation systems associated with intelligent user interaction monitoring and alert. For example, an IM system manager may input a login alias and password associated with a third-party service provider associated with a third-party computing device, such as third-party computing device 110, to receive data associated with the third-party computing devices. The IM system manager may additionally input an instruction to run automation, such as to automatically perform actions to remedy faults and/or potential future faults detected by the IM computing device(s) 102.

As illustrated in FIG. 2, the computing architecture 200 may include an application 214. The application 214 may include a web-based and/or native application. In various examples, the application 214 may include an application interaction component 120 configured to identify fault(s) associated with user interactions with various other applications associated with a collaborative system. The fault(s) may include inefficiencies associated with the user interactions, such as in completing a process associated with a service and/or function. In some examples, the fault(s) may include selections of a first application in lieu of a second application at a particular time in a process. In some examples, the fault(s) may include a determination that a time associated with a portion of the process exceeded a threshold time or that the total time associated with the process exceeded a threshold time.

As discussed above, the application interaction component 118 may receive event data corresponding to instances of user interactions with a user interface. The event data may include selections (e.g., clicks), a series (e.g., order) of selections within a particular application (e.g., managed by a computing device of the collaborative system 100), a number of selections associated with the particular application, a series of accessing different applications while performing a service, a time the agent spends in the particular application, a time associated with each selection in the particular application, a time between selections, a total time associated with performing the service, and the like. For example, an agent associated with agent computing device may generate a quote for an insurance policy. The agent may access a user interface on the agent computing device via which the agent may interact with seven applications managed by different computing devices of the collaborative system. The application interaction component 118 may receive event data corresponding to the user interactions with each of the seven application and determine whether a fault exists with the user interactions.

In various examples, the application interaction component 120 may include an application training component 216 configured to determine the one or more fault(s) associated with the user interactions. In various examples, the application training component 216 may receive event data corresponding to one or more user inputs associated with an agent performing a particular service and/or function. In some examples, the application training component 216 may store the event data in the datastore 212, such as in one or more agent profiles 218 (e.g., user profiles).

In various examples, the application training component 216 may determine one or more efficiency scores associated with the event data. In some examples, the efficiency score may be associated with the totality of the event data corresponding with performing the particular service and/or function. In some examples, the efficiency score may be associated with at least a portion of the event data. In some examples, the efficiency score may be based on performing a particular step of a series of steps associated with the particular service and/or function. In some examples, the efficiency score may be associated with user interactions with a particular application accessed by the user while performing the particular service and/or function.

In various examples, the efficiency score may be determined based on historical data associated with a plurality of agents. In such examples, the application training component 216 may access the historical data to determine the efficiency score. In some examples, the efficiency score may be determined based on a comparison of current event data to historical data associated with a same or similar service and/or function (e.g., average times and/or selections, optimized (e.g., fast) times and/or selections, etc.).

In various examples, the application training component 216 may be configured to determine one or more patterns associated with user interactions with the user interface and/or with applications. In some examples, the pattern(s) can include a series of user inputs via the user interface, a total number of user inputs received via the user interface and in association with event data, a time between a first user input and a second user input (e.g., time between selections), a total time associated with event data, a number of applications accessed in association with event data, a number of transitions between applications, a series of transitions between applications, and/or a number of user inputs corresponding to a function of the user interface. In some examples, the efficiency score can be based on the pattern(s) of user interactions, such as to perform a service for a customer or the like.

In various examples, the application training component 216 can determine one or more patterns associated with different agent interactions over time, such as based on the historical data, and can identify one or more enabling patterns and/or one or more inhibiting patterns. The enabling patterns may include patterns of user interactions that represent efficient operations with respect to a user interface and/or application. The inhibiting patterns may include patterns of user interactions that represent inefficient operations with respect to the user interface and/or application. In some examples, the application training component 216 may identify the enabling patterns and/or inhibiting patterns based on a comparison of the efficiency scores associated therewith. For example, the application training component 216 may determine a first pattern associated with a first agent performing a service and/or function for a first customer and a second pattern associated with a second agent performing the same service and/or function for a second customer. The application training component 216 may determine a first efficiency score associated with the first pattern and a second efficiency score associated with the second pattern. The application interaction component 120 may determine that the first efficiency score is greater than the second efficiency score and based on the determination, may identify the first pattern as an enabling pattern.

In some examples, the application training component 216 may determine the enabling and/or inhibiting patterns based on one or more threshold efficiency scores. In some examples, the application training component 216 may determine that a pattern is an enabling pattern based on a determination that an efficiency score associated therewith is above a first threshold score. In some examples, the application training component 216 may determine that a pattern is an inhibiting pattern based on a determination that an efficiency score associated therewith is below a second threshold score.

In various examples, the application training component 216 may be configured to determine an optimized pattern of user interaction for performing a particular service and/or function via the user interface. The optimized pattern may include a most efficient (e.g., highest efficiency score) and/or profitable pattern (e.g., least amount of total time to perform a service and/or function) of user interaction to perform the particular service and/or function. In at least one example, the optimized pattern may additionally be classified as an enabling pattern. In various examples, the optimized pattern may include a pattern of user interaction associated with a fastest time, a minimal number of transitions between applications, a minimal number of selections in each application, and/or other optimized actions associated with performing a service and/or function.

In various examples, an efficiency score associated with user interaction may be determined based at least in part on the optimized pattern of user interaction. In such examples, the efficiency score associated with a current user interaction may be determined based on a comparison between the current user interaction and at least a portion of an optimized pattern. For example, an efficiency score associated with a user interaction with a particular application while performing a service and/or function for a customer may be determined based on an optimized pattern of user interaction with the particular application while performing the service and/or function for the customer.

Based in part on the efficiency score, the application training component 216 may determine a fault associated with user interaction with a user interface and/or a particular application accessed while performing a service and/or function for a customer. For example, an agent may access three different applications to perform a service for a customer. The application training component 216 may determine a first efficiency score associated with interactions with the first application, a second efficiency score associated with interactions with the second application and a third efficiency score associated with interactions with the third application. The application interaction component may determine, based on the first efficiency score being less than the second efficiency score and the third efficiency score, that a fault exists with respect to user interaction with the first application. In some examples, the application training component 216 may determine the fault based on a respective efficiency score being less than a threshold score (e.g., 75%, 0.75, 80, etc.). In such examples, the application training component 216 may determine that the fault exists based on a determination that the respective efficiency score is less than the threshold score. Continuing the example from above, the application training component 216 may determine that the first efficiency score is below a threshold score, while the second efficiency score and the third efficiency score are above the threshold score. Based on a determination that the first efficiency score is below the threshold score, the application training component 216 may determine a fault with respect to the user interaction with the first application.

In some examples, the application training component 216 may determine a fault associated with user interaction efficiencies based on one or more trends associated with a particular user. In some examples, the application training component 216 can be configured to identify the trend(s) associated with a particular agent based on different instances of user interactions while performing a particular service and/or function, such as those determined over time. In some examples, the application training component 216 may receive user interactions associated with the particular agent over time and may store the user interactions in a datastore 212, such as in an agent profile 218 associated with the particular agent. In examples where a fault was determined with the user interactions, the datastore 212 may also store an indication of the determined fault, action(s) that were recommended in response, and/or results of the action(s) (e.g., whether the fault was successfully remedied). In some examples, the user interactions may be stored based on a time, a service provided, and/or a function performed associated therewith. In various examples, the application training component 216 may determine the trends based on the different instances of user interactions associated with a same or similar service provided and/or function performed. In some examples, the application training component 216 may compare current efficiency scores associated with event data corresponding to a particular user to previous efficiency scores associated with historical data corresponding to the particular user to determine the trend(s). In various examples, the trend(s) may include improvements in performance or degradations in performance with respect to user interaction with one or more applications and/or performing a service and/or function.

In some examples, the application training component 216 may be configured to identify, based on the trend(s), that a particular agent is struggling with (e.g., experiencing inefficiencies, performance degradations) an upgrade and/or modification to an application. For example, an application associated with performing a particular service and/or function may be updated and/or modified, such as by an application manager. The application training component 216 may receive event data associated with an agent interaction with the updated and/or modified application. The application training component 216 may access historical data associated with a particular agent and may determine, based on the historical data, that the agent is struggling with the modification or update to the application (e.g., time between selections in the modified application slower by a threshold amount than previous interactions). The application training component 216 may determine the fault associated with user interaction with the modified application.

In various examples, the application training component 216 may determine, based in part on historical data associated with the particular agent, that other agents may also struggle (e.g., experience unexpected inefficiencies, slow performance, etc.) with the upgrade and/or modification to the application. In some examples, the application training component 216 may determine that other agents may also struggle based on an agent profile 218 associated with the particular agent. In such examples, the application training component 216 may determine that based on a performance record, experience level, or the like associated with the particular agent, that other agents may also struggle. For example, the application training component 216 may determine that the particular agent has performed the same service 30 times in the past with an average efficiency score of 85%. Based on the efficiency score above a threshold, the application training component 216 may determine that other agents will likely struggle with the upgraded and/or modified application.

In some examples, the application training component 216 may preemptively provide notifications to agents interacting with the upgraded and/or modified application. In such examples, based on a determination that the agent is interacting with the upgraded and/or modified application, the application training component 216 may provide a notification to the agent. The notification may include an indication of the changes and/or one or more actions to take to optimize efficiency of operations with respect to the upgraded and/or modified application. In some examples, the application training component 216 may provide a notification to a computing device associated with management of the upgraded and/or modified application to make an additional modification thereto, such as to prevent the inefficiencies. In such examples, the application training component 216 may be configured to alert a managing computing device of current issues (e.g., errors, inefficiencies, etc.) associated with an application.

In various examples, the application training component 216 may be configured to determine one or more actions (e.g., recommended actions) for the agent to perform to remedy the fault and/or improve interactions with the user interface and/or an application. The action(s) may include a series of user inputs associated with the user interface (e.g., alternate order of selections, etc.) and/or a particular application, a series of applications accessed to perform a service (e.g., alternate order of accessing applications), a suggested user input corresponding to a function of the user interface (e.g., input wildcard symbol associated with search function), and/or other actions designed to remedy faults associated with user interactions with a user interface. For example, the user interface may include a search function, configured to enable an agent to search for and find customer information. The application training component 216 may receive event data associated with twelve different inputs of the customer's name before the agent accessed customer information associated with the intended customer. The application training component 216 may determine that performing an action, such as utilizing a wildcard symbol in the search, would increase efficiency of a search in which the agent did not know a proper spelling of the customer's name.

In some examples, the application training component 216 may generate a notification to provide to the agent, such as via an associated agent device, to alert the agent of the fault and/or the action to take to improve efficiency of user interactions. In some examples, the notification may include a push notification, electronic mail, short message system message, or other notification system configured to alert a person of the fault and/or the action, such as that transmitted via the communication interface(s) 208.

In various examples, the application training component 216 may receive event data corresponding to a particular agent interaction with a user interface and may determine to provide a notification comprising one or more recommended actions based on agent data associated with the particular agent. In such examples, the application training component 216 may determine that the agent is interacting with the user interface and may access the agent data, such as that stored in the agent profile(s) 218. In some examples, the application training component 216 may determine an experience level of the agent (e.g., months/years of employment, number of times the agent has performed a current service and/or function, a number of times the agent has performed the current service and/or function within a threshold time period (e.g., last month, last year, etc.), etc.). In some examples, the application training component 216 may determine whether the experience level of the agent is below a threshold level. The threshold level may include a threshold number of years and/or months of employment, a number of times the agent has performed the current service and/or function, a number of times performing the current service and/or function in the recent past. Based on a determination that the experience level of the agent is below the threshold level, the application training component 216 may generate one or more notifications to assist the agent in optimizing efficiency in user interactions.

In various examples, the application interaction component 120 may include a diagnostic component 220 configured to perform one or more diagnostic functions associated with a collaborative system, such as collaborative system 100. In various examples, the diagnostic function can be associated with determining one or more faults and/or actions to perform in association with the fault(s) based on previous event data. In various examples, the diagnostic component 220 may be configured to receive a request for information associated with a user interaction and/or an application. In some examples, the request for information may be received from an agent device, such as in the form of a troubleshooting request. For example, an agent may experience some confusion about how to best input data associated with a particular application. The agent may submit the request for information associated with the particular application. Responsive to receiving the request, the diagnostic component 220 may access event data from a previous user interaction between the agent and the particular application, such as to replay the previous user interaction. The diagnostic component 220 may evaluate the previous user interaction to determine one or more faults and/or actions for the agent to perform to increase efficiency with respect to the application.

In various examples, the diagnostic component 220 may receive a request for information from a computing device associated with an application manager (e.g., software developer, etc.). In some examples, the request for information may include a request to determine one or more aspects of the application that could be improved. In some examples, the request for information may include a request to determine a particular portion of the application and/or process associated therewith that agents struggle with (e.g., time between clicks exceeds a threshold, etc.). In various examples, the diagnostic component 220 may access a plurality of event data associated with a plurality of agent devices to determine a response to the request. For example, the diagnostic component 220 may playback the plurality of event data to determine where (e.g., particular functions, steps of a process, etc.) agents struggle (e.g., experience decreased efficiency, spend a significant amount of time, etc.). The diagnostic component 220 may provide the particular functions, steps of the process, and the like in which agents struggle, such as for the application manager to improve the application.

As illustrated in FIG. 2, the application 214 may include a training component 122. In some examples, the training component 122 may train one or more data models 124 to identify one or more faults associated with user interaction with a user interface. In such examples, the data model(s) 124 may be trained to identify faults based on training data including previous faults associated with event data corresponding to a plurality of agent devices associated with a collaborative system.

In some examples, the training component 122 may train the data model(s) 124 to identify one or more actions for an agent to perform, such as to remedy the fault and/or optimize agent performance. In such examples, the data model(s) 124 may be trained to identify the actions based on historical data associated with the plurality of agent devices and/or agent interactions.

In various examples, the application interaction component 120 may store event data, agent data, detected faults, and/or actions to remedy the faults and/or optimize agent performance in the datastore 212. In some examples, the application interaction component 120 may be configured to determine a results of an action (e.g., whether the agent performed the action, a success and/or failure of an action to improve efficiency or remedy the fault). In some examples, the application interaction component 120 may store the results in the datastore 212. In some examples, the results may be used, by the training component 122, as training data to train the one or more data models 124.

Figure 3:
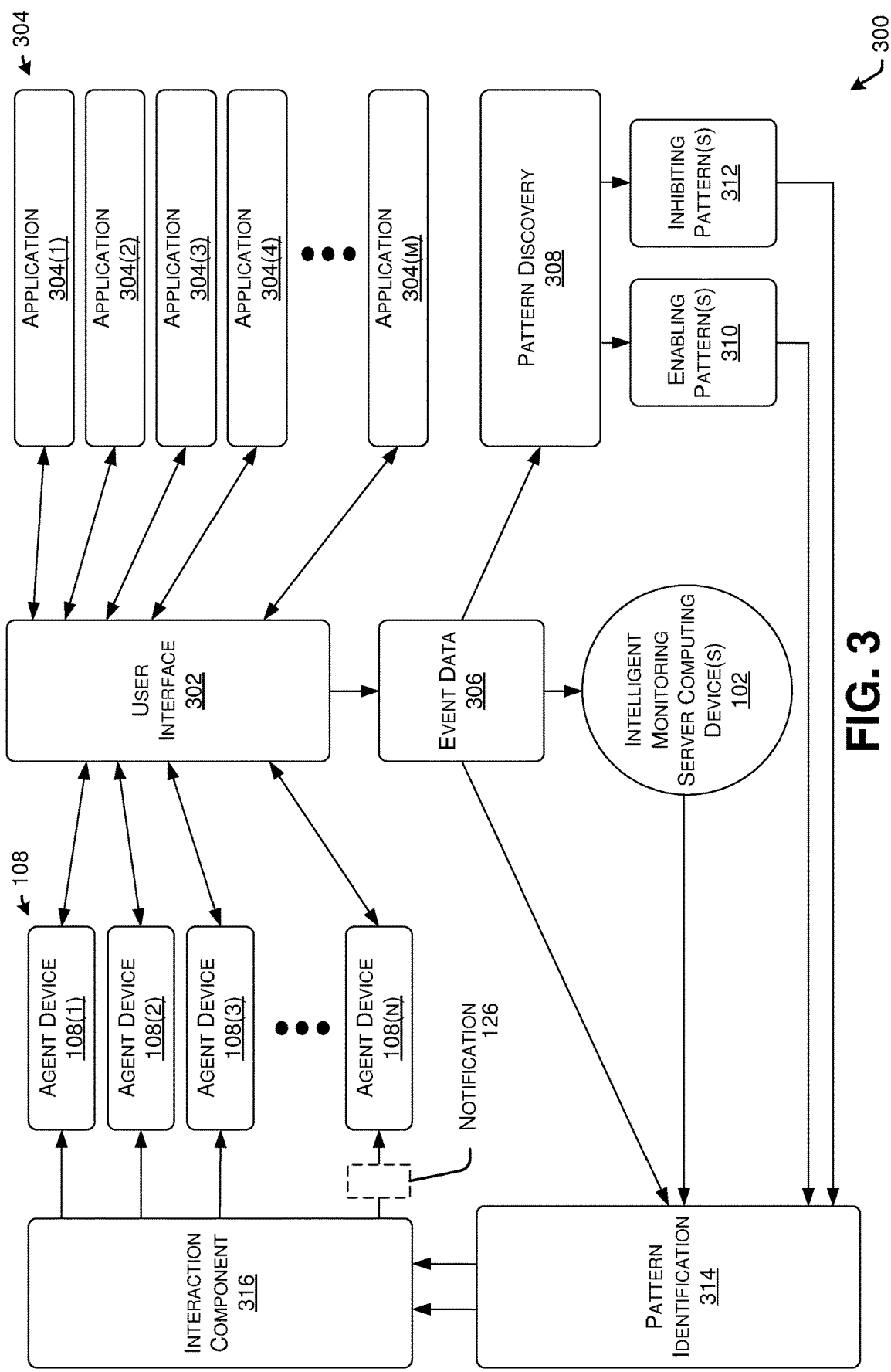
FIG. 3 illustrates an example flow diagram associated with an intelligent user interface monitoring and alert system.

FIG. 3 illustrates example data flow 300 associated with an intelligent user interface monitoring and alert system of a collaborative computing system 100. In various examples, the data flow 300 may begin with an agent device 108, such as agent device 108(1), agent device 108(2), agent device 108(3), and/or agent device 108(N) interacting with a user interface 302. In various examples, an instance of the user interface 302 may be installed on and/or accessible to each of the agent device(s) 108. For example, a first agent device 108(1) may include a first instance of the user interface 302, a second agent device 108(2) may include a second instance of the user interface 302, and so on.

In some examples, the user interface 302 may include a user interface associated with a particular application 304, such as a first application 304(1). In some examples, the user interface 302 may include a user interface configured to link one or more applications 304, such as the first application 304(1), a second application 304(2), a third application 304(3), a fourth application 304(4), or another application 304(M). In such an example, an agent (e.g., user) accessing the user interface 302 may be capable of switching between two or more applications 304. Though illustrated as being associated with five different applications, this is not intended to be so limiting, and the user interface 302 may enable access to a greater or fewer number of applications 304.

In various examples, the user interface 302 may be configured to process user interactions with the user interface 302, such as selecting an application 304(M), executing a particular function of the application 304(M), switching to the first application 304(1), inputting data into the first application 304(1), and the like. In various examples, the user interactions with the user interface 302 may be identified as event data 306. As discussed above, the event data 306 can include selections (e.g., clicks), inputs, times associated with inputs (e.g., time between clicks, etc.) navigation history (e.g., between applications 304, within an application 304(1), etc.), login history, time to perform a service and/or function, number of iterations of performing a same function, and/or any other interaction with an application via the user interface.

In various examples, the user interface 302 associated with an agent device 108(1) may send the event data 306 to the IM computing device(s) 102. In various examples, the IM computing device(s) 102 may be configured to perform pattern discovery 308 based on the event data 306. A pattern may include one or more characteristics associated with a collection of event data 306. The collection of event data 306 may include a session of user interaction with the user interface 302, such as to perform a particular service and/or function for a customer. The collection of event data 306 (e.g., session) may be determined based on a time associated with the user interaction (e.g., time between user selections exceeds a maximum time), an indication that the service or function is complete, a logout event, or any other indication to denote a break in related user selections. In various examples, the pattern discovery 308 may include determining the related user interactions with the user interface 302 (e.g., user interactions associated with performing a particular service and/or function). For example, an agent may interact with the user interface 302 on the agent device 108(1), with each subsequent selection within an application 304(1) or between applications 304 being less than a threshold amount of time. The IM computing device 102 may determine that a time between two selections exceeds a maximum time, and the IM computing device 102 may determine that the agent is no longer interacting with the user interface 302 in a same capacity (e.g., not performing the same service and/or function as with the previous interactions, conducting a separate session). For another example, the IM computing device 102 may receive an indication that a particular service and/or function that an agent is performing is complete. The indication may be received as data, such as the data 104 from another computing device, such as enterprise computing device 106, responsive to the service and/or function (e.g., receive an insurance quote in response to an agent inquiry for the insurance quote). Based on receipt of the indication, the IM computing device(s) 102 may determine that the session associated with the particular service and/or function is complete.

In various examples, the pattern discovery 308 may include identifying enabling patterns 310 and/or inhibiting patterns 312 from the event data 306 collected over a period of time (e.g., historical event data). The enabling patterns 310 may include patterns of user interactions that represent efficient operations with respect to the user interface 302 and/or an application 304. The inhibiting patterns 312 may include patterns of user interactions that represent inefficient operations with respect to the user interface 302 and/or application 304. In various examples, the pattern discovery 308 may determine the enabling patterns 310 and/or inhibiting patterns 312 utilizing machine learning techniques. In various examples, the enabling patterns 310 and/or the inhibiting patterns 312 may be utilized as training data to train a data model, such as for pattern identification 314. In some examples, the enabling patterns 310 and/or inhibiting patterns 312 may be determined based on one or more efficiency scores, such as those described above. In various examples, the efficiency scores may be determined utilizing machine learning techniques and/or statistical analysis of the historical event data, as described above.

In various examples, the IM computing device(s) 102 may be configured to perform pattern identification 314 on a particular collection of event data 306 (e.g., a session of user interaction with the user interface 302. In various examples, the pattern identification 314 may be configured to determine related user interactions with the user interface 302 (e.g., user interactions associated with performing a particular service and/or function). In such examples, the pattern identification 314 may assess related user interactions with the user interface 302, such as to identify one or more inefficiencies associated therewith.

In some examples, the pattern identification 314 may be configured to determine one or more efficiency scores associated with the particular collection of event data 306. In some examples, the efficiency score may include an overall score associated with the session of user interaction associated with the pattern. In such examples, the efficiency score may represent an overall efficiency of the agent in performing a particular service and/or function via the user interface 302. In some examples, the pattern identification 314 may determine efficiency scores associated with user interactions with each application 304 with which the agent interacts via the user interface 302 while performing a service and/or function. For example, an agent may switch between three different applications 304 while performing a service and/or function for a customer. The pattern discovery 308 may determine that the agent has a first efficiency score associated with a first application 304(1), a second efficiency score associated with a second application 304(2), and a third efficiency score associated with a third application 304(3).

In various examples, the pattern identification 314 may determine whether a current collection of event data 306 (e.g., real-time, near real-time, currently being analyzed) represents an enabling pattern 310 or an inhibiting pattern 312. In some examples, the determination as to whether the collection of event data 306 represents an enabling pattern 310 or an inhibiting pattern 312 may be determined based on the efficiency score(s). In some examples, an efficiency score at or above a first threshold score represents an enabling pattern. In some examples, an efficiency score at or below a second threshold score represents an inhibiting pattern. The first threshold and the second threshold may be the same or different thresholds.

In various examples, the pattern identification 314 may determine a fault associated with the user interaction with the user interface 302. The fault may include an inefficiency associated with the user interaction, a failure to input data in a correct location, at a correct time, in a correct order, etc. In some examples, a determination of fault can be based on a classification of the current collection of event data 306 as an inhibiting pattern 312. In some examples, the pattern identification 314 may determine the fault based on the efficiency score. In such examples, the pattern identification 314 may determine the fault based on an efficiency score associated with the current collection of data 306 being equal to or less than a threshold efficiency score. As discussed above, the efficiency score can include an overall score (e.g., overall efficiency associated with user interaction) or a score associated with a particular application 304(M) or function thereof (e.g., efficiency related to interaction with the application 304(M)).

In various examples, an interaction component 316 may determine a portion of the user interaction (e.g., a particular user interaction) associated with the fault. In some examples, the fault may be associated with a particular area for improvement with regard to the user interface (e.g., interacting with an application 304(M) or function thereof). For example, an agent may search for customer information utilizing a search function associated with the application 304(M). The interaction component 316 may determine a fault corresponding to the user interaction with the search function based on the efficiency score being below a threshold, due in part to a number of iterations the agent attempted to enter the customer's name before determining a correct spelling.

In various examples, the interaction component 316 may determine one or more actions for the agent to take to remedy the fault (e.g., improve efficiency) with respect to the user interface 302. In various examples, based on a determination that an efficiency score is at or below a threshold score, the interaction component 316 may determine the action(s) for the agent to take to improve the efficiency score. The action(s) may include a series of user inputs associated with the user interface 302 (e.g., alternate order of selections, etc.) and/or a particular application 304(M), a series of applications 304 accessed to perform a service (e.g., alternate order of accessing applications 304), a suggested user input corresponding to a function of the user interface 302 (e.g., input wildcard symbol associated with search function), and/or other actions designed to remedy faults associated with user interactions with a user interface.

In various examples, the interaction component 316 may generate a notification 126 to provide to the agent, such as via an associated agent device 108(N), to alert the agent of the fault and/or the action to take to remedy the fault (e.g., operate more efficiently). In some examples, the notification 126 may include a push notification, electronic mail, short message system message, or other notification system configured to alert a person of the fault and/or the action. Continuing the example from above, the interaction component 316 may determine a fault corresponding to user interaction of a search function associated with the user interface 302. The interaction component 316 may determine that the agent could improve efficiency by utilizing a wildcard symbol while conducting a search in which the agent is not aware of a correct spelling of a customer name. The interaction component 316 can generate a notification including a message such as "I see that you had trouble finding the correct spelling of the customer name. Try using a wildcard next time you are unsure of the spelling. It might help!"

In various examples, the interaction component 316 may cause the notification 126 including the fault and/or the action to be presented on a display of the agent device 108(N). In various examples, the interaction component 316 may cause the notification to be stored in a datastore of the agent device 108(N) and/or the IM computing device(s) 102. In various examples, the interaction component 316 may be configured to determine a subsequent interaction with the user interface 302 in which the agent is performing another iteration of the service and/or function. In such examples, the interaction component 316 may cause the notification to be presented on the display of the agent device 108(N) during the subsequent interaction. Continuing the search example from above, the interaction component 316 may determine that the agent is conducting a subsequent search for customer information (e.g., has selected a search icon, etc.). The interaction component 316 may cause the notification to be presented in response to the identification of the subsequent search, such as to remind the agent of the wildcard entry to quickly find a customer without knowing an exact spelling of their name.

FIGS. 4-9 are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

Figure 4:
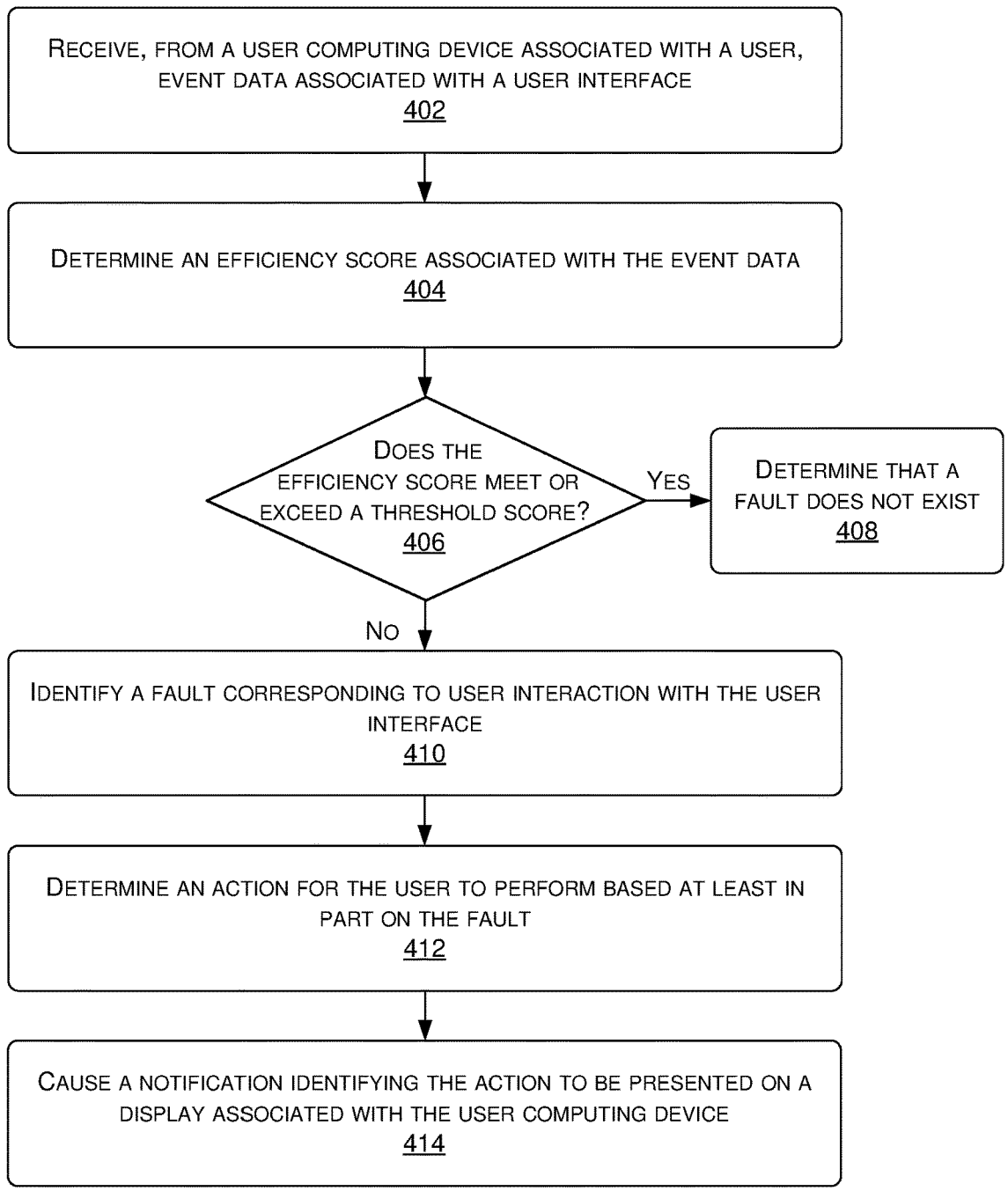
FIG. 4 is a flow diagram illustrating an example process for providing a notification of a fault.

FIG. 4 is an example process 400 for providing a notification of a fault associated with a user interaction with a user interface and an action to take to remedy the fault. In various examples, the process 400 is described with reference to the system 100 and may be performed by the IM computing device(s) 102 and/or in cooperation with any one or more of the agent computing device(s) 108, the enterprise computing devices 106, and/or the third-party computing devices 110. Of course, the process 400 may be performed in other similar and/or different environments.

At operation 402, the process 400 includes receiving, from a user computing device associated with a user, event data associated with a user interface. In various examples, the user computing device may be an agent computing device and the user may be an agent associated with an organization. In at least one example, the user may include an agent associated with an organization configured to perform one or more services for a customer. In such an example, the services may include services related to insurance (e.g., automobile, life, property, small business etc.), banking (e.g., loans, savings, checking, etc.), and/or other services.

In various examples, the event data may include user interactions with the user interface. In such examples, the event data may include selections (e.g., clicks), inputs, times associated with inputs (e.g., time between clicks, etc.) navigation history (e.g., between applications, within an application, etc.), login history, time to perform a service and/or function, number of iterations of performing a same function, and/or any other interaction with an application via the user interface.

In various examples, the IM computing device(s) 102 may determine a collection of event data. The collection of event data may include event data related to or associated with user interactions corresponding to the user performing a particular service and/or function. In various examples, the collection of event data may be associated with a particular session of user interaction associated with the particular service and/or function. The collection of event data may be determined based on a time associated with the user interaction (e.g., time between user selections exceeds a maximum time), an indication that the service or function is complete, a logout event, or any other indication to denote a break in related user selections. For example, the IM computing device 102 may receive an indication that a particular service and/or function that an agent is performing is complete. The indication may be received as data, such as the data 104 from another computing device, such as third-party computing device 110, responsive to the service and/or function (e.g., complete banking transaction). Based on receipt of the indication, the IM computing device(s) 102 may determine that the session associated with the particular service and/or function is complete and may store the user interactions associated with the session as a collection of event data, such as in a datastore.

At operation 404, the process 400 includes determining an efficiency score associated with the event data. In some examples, the efficiency score may be determined based on a particular service the agent is providing, a particular application the agent is accessing, a function the agent is performing with regard to a particular application, and/or other interaction with the user interface. In some examples, the IM computing device 102 may determine the efficiency score associated with the session (collection of event data). In such examples, the efficiency score may represent an overall efficiency of the agent in performing the particular service. In some examples, the efficiency score may be associated with a particular application and/or function associated therewith. For example, a user may access three applications to provide a service for a customer. The IM computing device(s) 102 may determine that the user interaction with a first application includes a first efficiency score (e.g., 87%, 0.87, 87, etc.), user interaction with a second application includes a second efficiency score (e.g., 40%, 0.40. 40, etc.) and user interaction with a third application includes a third efficiency score (e.g., 89%, 0.89, 89, etc.).

In some examples, the efficiency score can be determined based on historical data associated with user interactions with a plurality of agent devices (e.g., a plurality of data received from the plurality of agent devices). In such examples, the IM computing device(s) 102 can compare user interactions with previous user interactions to determine the efficiency score, as described above.

In various examples, the IM computing device(s) 102 can determine the efficiency score based on one or more patterns of user interactions. The patterns can include enabling patterns and/or inhibiting patterns. In some examples, the efficiency score can be determined based on a comparison of a current session to one or more previous enabling and/or inhibiting patterns. In at least one example, at least one of the enabling patterns, the inhibiting patterns, and/or the efficiency score can be determined utilizing machine learning techniques.

In various examples, the IM computing device(s) 102 may be configured to determine an optimized pattern of user interaction for performing a particular service and/or function via the user interface. The optimized pattern may include a most efficient (e.g., highest efficiency score) and/or profitable pattern (e.g., least amount of total time to perform a service and/or function) of user interaction to perform the particular service and/or function. In at least one example, the optimized pattern may additionally be classified as an enabling pattern. In various examples, the optimized pattern may include a pattern of user interaction associated with a fastest time, a minimal number of transitions between applications, a minimal number of selections in each application, and/or other optimized actions associated with performing a service and/or function.

In various examples, an efficiency score associated with user interaction may be determined based at least in part on the optimized pattern of user interaction. In such examples, the efficiency score associated with a current user interaction may be determined based on a comparison between the current user interaction and at least a portion of an optimized pattern. For example, an efficiency score associated with a user interaction with a particular application while performing a service and/or function for a customer may be determined based on an optimized pattern of user interaction with the particular application while performing the service and/or function for the customer.

At operation 406, the process 400 includes determining whether the efficiency score meets or exceeds a threshold score. In some examples, the threshold score may be determined based at least in part on one or more of the enabling patterns and inhibiting patterns. In some example, the threshold score may be determined based on the optimized pattern of user interaction. For example, the threshold score may represent 75% of the optimized pattern (e.g., a speed and/or efficiency equivalent to the $75^{th}$ percentile).

Based on a determination that efficiency score meets or exceeds the threshold score ("Yes" at operation 406), the process 400 includes, at operation 408, determining that a fault does not exist with respect to the user interaction. In some examples, the determination that the fault does not exist may include a determination that the user interaction with the user interface is efficient and/or accurate. In some examples, the determination that the fault does not exist may include a determination that the user interaction may not benefit from coaching or suggested improvements.

Based on a determination that the efficiency score does not meet or exceed the threshold score ("No" at operation 406), the process 400 includes, at operation 410 identifying a fault corresponding to user interaction with the user interface. The fault may include an inefficiency or error (e.g., incorrect selections, series of selections, etc.) associated with the user interaction.

At operation 412, the process 400 includes determining an action for the user to perform based at least in part on the fault. The action may include a series of user inputs associated with the user interface (e.g., alternate order of selections, etc.) and/or a particular application, a series of applications accessed to perform a service (e.g., alternate order of accessing applications), a suggested user input corresponding to a function of the user interface (e.g., input wildcard symbol associated with search function), and/or other actions designed to remedy the fault associated with user interactions with a user interface, as described herein.

At operation 414, the process 400 includes causing a notification including the action to be presented on a display associated with the user computing device. In some examples, the notification may include a push notification, electronic mail, short message system message, or other notification system configured to alert a person of the fault and/or the action. In some examples, the notification may be displayed in association with the user interface. In some examples, the notification may include the fault and the action for the user to perform to remedy the fault (e.g., increase efficiency in user interactions with the user interface). For example, the IM computing device(s) 102 may determine that an agent performing a particular service for a customer is switching from a first application to a second application without completing steps associated with the particular service in the first application. Due to the premature switch from the first application to the second application, the agent is required to transition back to the first application to complete the steps prior to completing the service. The IM computing device(s) 102 may cause a notification including the fault (e.g., premature switch between applications) and the action (e.g., complete information in the first application prior to switching to improve efficiency) to be presented on a display of the agent computing device, alerting the agent of the fault and/or the action.

Figure 5:
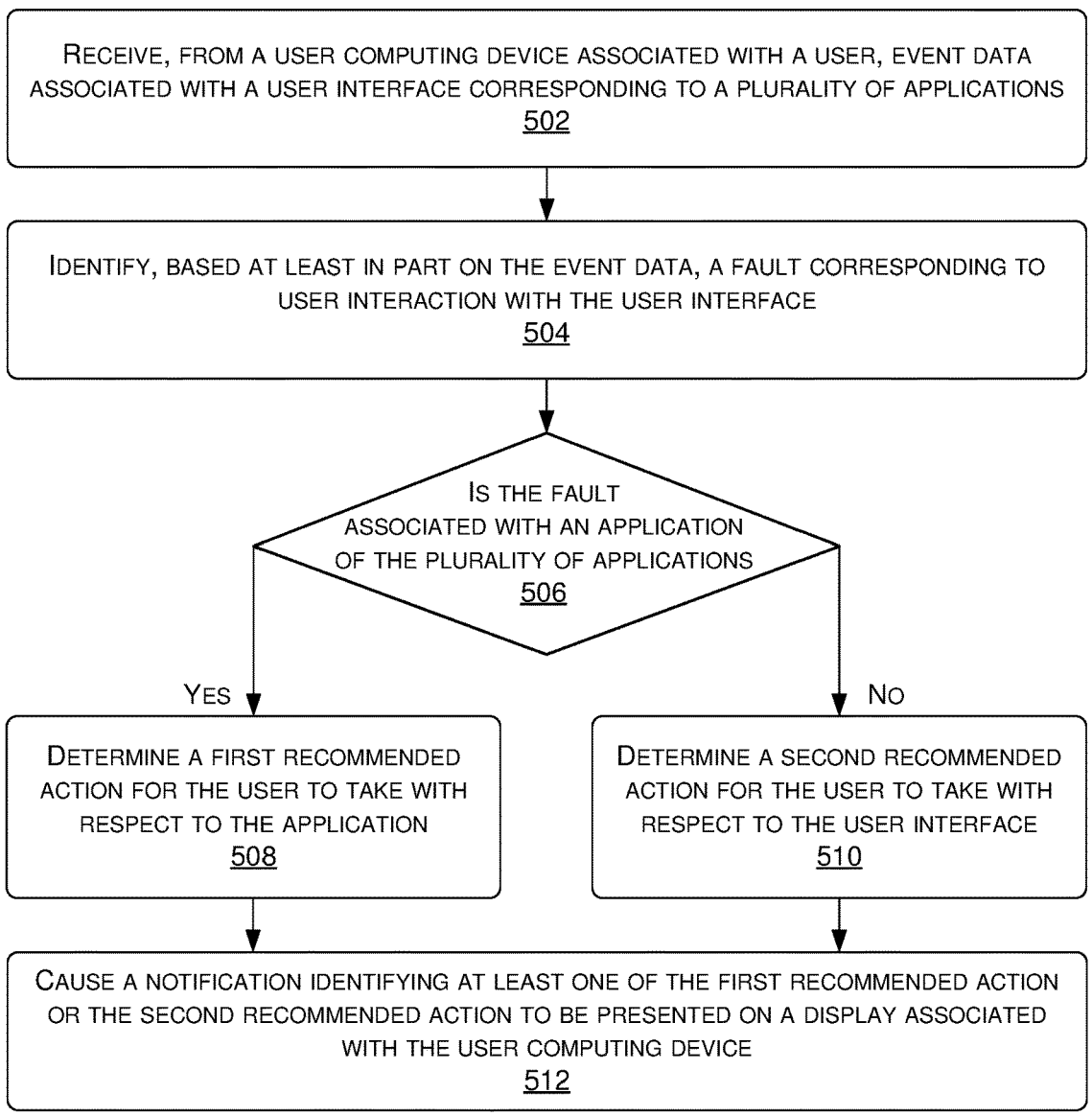
FIG. 5 is a flow diagram illustrating an example process for determining an action to take to remedy a fault.

FIG. 5 illustrates an example process 500 for determining an action to take to remedy a fault associated with user interaction with a user interface based on a determination of whether the fault corresponds to an application of a collaborative computing system. In various examples, the process 500 is described with reference to the system 100 and may be performed by the IM computing device(s) 102 and/or in cooperation with any one or more of the agent computing device(s) 108, the enterprise computing device(s) 106, and/or the third-party computing device(s) 110. Of course, the process 500 may be performed in other similar and/or different environments.

At operation 502, the process 500 includes receiving, from a user computing device associated with a user, event data associated with a user interface corresponding to a plurality of applications. The user interface may be configured to enable access to the plurality of applications, such that the user may access and/or input data in association with the plurality of applications via the user interface. In various examples, the user computing device may be an agent computing device and the user may be an agent associated with an organization. In at least one example, the user may include an agent associated with an organization configured to perform one or more services for a customer. In such an example, the services may include services related to insurance (e.g., automobile, life, property, small business etc.), banking (e.g., loans, savings, checking, etc.), and/or other services.

In various examples, the event data may include user interactions with the user interface. In such examples, the event data may include selections (e.g., clicks), inputs, times associated with inputs (e.g., time between clicks, etc.) navigation history (e.g., between applications, within an application, etc.), login history, time to perform a service and/or function, number of iterations of performing a same function, and/or any other interaction with an application via the user interface.

In various examples, the IM computing device(s) 102 may determine a collection of event data. The collection of event data may include event data related to or associated with user interactions corresponding to the user performing a particular service and/or function. In various examples, the collection of event data may be associated with a particular session of user interaction associated with the particular service and/or function. The collection of event data may be determined based on a time associated with the user interaction (e.g., time between user selections exceeds a maximum time), an indication that the service or function is complete, a logout event, or any other indication to denote a break in related user selections. For example, the IM computing device 102 may receive an indication that an agent has logged out of an account associated therewith. The indication may be received as data, such as the data 104 the agent device or from another computing device, such as an enterprise computing device 106, responsive to a logout input received from the agent device. Based on receipt of the indication, the IM computing device(s) 102 may determine that the session associated with the agent is complete and may store the user interactions associated with the session as a collection of event data, such as in a datastore.

At operation 504, the process 500 includes identifying, based at least in part on the event data, a fault corresponding to user interaction with the user interface. In some examples, the fault may be associated with user interaction during a particular session. In such examples, the fault may be associated with user interaction with the user interface while the user is performing a particular service and/or function. The fault may include an inefficiency associated with the user interaction, a failure to input data in a correct location, at a correct time, in a correct order, etc.

In some examples, the IM computing device(s) 102 may determine the fault based on one or more efficiency scores associated with the user interaction. In some examples, the efficiency score(s) may include an overall score associated with the user interaction and/or a score associated with interaction with a particular application and/or function thereof. In various examples, the efficiency score(s) may be determined utilizing machine learning techniques. In various examples, the IM computing device(s) may determine the fault based on a determination that an efficiency score associated with the user interaction (e.g., the collection of event data) is at or below a threshold efficiency score.

In some examples, a determination of fault can be based on a classification of the current collection of event data as an inhibiting pattern. In such examples, the IM computing device 102 may be configured to receive the collection of event data and determine one or more inhibiting patterns or enabling patterns associated therewith. The enabling patterns may include patterns of user interactions that represent efficient operations with respect to the user interface and/or an application accessed through the user interface. The inhibiting pattern(s) may include patterns of user interactions that represent inefficient operations with respect to the user interface and/or an application accessed through the user interface. In various examples, the IM computing device 102 may determine the enabling patterns and/or inhibiting patterns utilizing machine learning techniques. In some examples, the enabling patterns and/or inhibiting patterns may be determined based on the efficiency score(s) described above.

At operation 506, the process 500 includes determining whether the fault is associated with an application of the plurality of applications. As discussed above, a fault may be associated with the user interaction with a user interface of the agent device. In some examples, the fault may represent an inefficient user interaction with the agent device (e.g., a native application and/or function). In some examples, the fault may represent an inefficient interaction with another application, such as a web-based application that is managed by an enterprise computing device and/or a third-party computing device. In various examples, the IM computing device(s) 102 may determine the application associated with the fault and/or a function of the application with which the agent is inefficient or operating at a suboptimal level.

Based on a determination that the fault is associated with an application ("Yes" at operation 506), the process, at operation 508, includes determining a first recommended action for the user to take with respect to the application. In some examples, the first recommended action may be determined based on the particular application and/or function of the application with which the agent is operating at a suboptimal level. The first recommended action may include a series of user inputs associated with the application (e.g., alternate order of selections, etc.), a suggested user input corresponding to a function of the application (e.g., input wildcard symbol associated with search function), and/or other actions designed to remedy faults associated with user interactions with a user interface associated with an application.

Based on a determination that the fault is not associated with an application ("No" at operation 506), the process, at operation 510, determining a second recommended action for the user to take with respect to the user interface. In some examples, the fault may be associated with the user interface itself (e.g., a login event, launching the user interface, use of the user interface, etc.), a series of applications accessed via the user interface (e.g., fault is associated with an order in which the agent accesses applications, etc.), the agent device (e.g., settings, etc.), or the like. The second recommended action may include a series of user inputs associated with the user interface (e.g., alternate order of selections, etc.), a series of applications accessed to perform a service (e.g., alternate order of accessing applications), recommended device settings, and/or other actions designed to remedy faults associated with user interactions with a user interface.

In some examples, historical data identifying faults and corresponding remedial actions may be used to determine the first and second recommended actions. For example, the current collection of event data may be matched with historical data associated with a same or similar service and/or function stored in a datastore (e.g., datastore 212) to find similar event data. The match may be based on similar statistical properties (e.g., average times, average number of selections, etc.), or a similar sequence of selections e.g., based on edit distance between the sequences being less than a threshold. The recommended action(s) for the current collection of event data may be based on the action(s) taken in the matching historical event data, in particular, the action(s) that resulted in successful remedy of the fault.

At operation 512, the process 500 includes causing a notification including at least one of the first recommended action or the second recommended action to be presented on a display associated with the user interface. In some examples, the notification may include a push notification, electronic mail, short message system message, or other notification system configured to alert a person of the fault and/or the action. In some examples, the notification may be displayed in association with the user interface. In some examples, the notification may additionally include the fault associated with the at least one of the first recommended action or the second recommended action. For example, the IM computing device(s) 102 may determine that an agent performing a particular service for a customer is switching from a first application to a second application without completing steps associated with the particular service in the first application. Due to the premature switch from the first application to the second application, the agent is required to transition back to the first application to complete the steps prior to completing the service. The IM computing device(s) 102 may cause a notification including the fault (e.g., premature switch between applications) and the action (e.g., complete information in the first application prior to switching to improve efficiency) to be presented on a display of the agent computing device, alerting the agent of the fault and/or the action.

Figure 6:
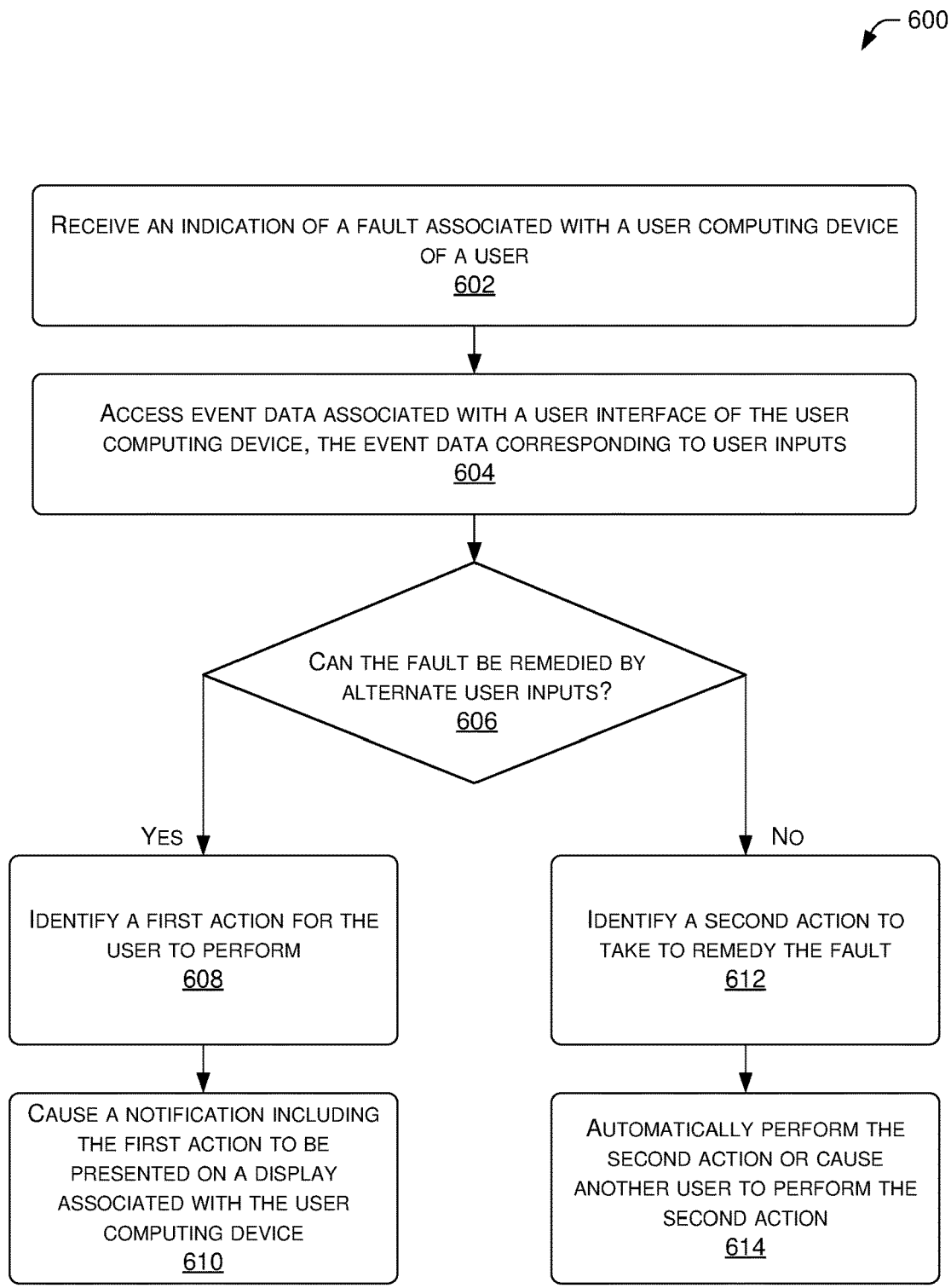
FIG. 6 is a flow diagram illustrating an example process for identifying a fault and determining an action to take to remedy the fault.

FIG. 6 illustrates an example process 600 for identifying a fault and determining an action to take to remedy the fault based on a determination of whether the fault can be remedied by alternate user inputs. In various examples, the process 600 is described with reference to the system 100 and may be performed by the IM computing device(s) 102 and/or in cooperation with any one or more of the enterprise computing device(s) 106, the agent computing device(s) 108, and/or the third-party computing device(s) 110. Of course, the process 600 may be performed in other similar and/or different environments.

At operation 602, the process 600 includes receiving an indication of a fault associated with a user computing device (e.g., agent device). In some examples, the indication of the fault may be received from the user computing device and/or from another computing device associated with a collaborative system. In at least one example, the indication of the fault may be generated by a component of the IM computing device(s) 102.

In various examples, the IM computing device(s) 102 may be configured to receive data, such as the data 104, from a plurality of computing devices of a collaborative system. In some examples, the plurality of computing devices may include one or more computing devices associated with another organization, such as third-party computing device(s) 110 associated with a third-party resource. In some examples, the third-party resource may include a third-party service provider, such as that configured to provide software as a service, a platform as a service, an infrastructure as a service, an application, or the like. In some examples, the plurality of computing devices may include one or more computing devices associated with an organization or enterprise of the IM computing device(s) 102 (e.g., server computing device), such as enterprise computing device(s) 106 and/or the agent device(s) 108.

The plurality of computing devices may be associated with a two or more disparate organizations and may be geographically separated from one another. As such, the plurality of data streams may be transmitted to the IM computing device(s) via the one or more networks. The network(s) may include public and/or private networks. In some examples, at least one data stream of the plurality of data streams may include network data associated with at least one network. In such examples, the at least one data stream may include latency information, reported incidents, real-time events, logged events, workload utilization, system performance degradation, and/or other data associated with the at least one network.

In various examples, the IM computing device(s) may determine a fault associated with a computing device and/or network associated with the collaborative system based on the received data. In some examples, the fault may include hardware failures, software errors, firewall errors, slow processing speed, lack of memory, power loss, lack of connectivity, network slow-downs, and/or any other computer or network-related issue that may delay or prevent the transmission of the data. In some examples, the fault may include an inefficiency associated with user interaction with a user interface corresponding to the user computing device.

At operation 604, the process 600 includes accessing event data associated with a user interface of the user computing device, the event data corresponding to user inputs. The event data may include may include selections (e.g., clicks), a series (e.g., order) of selections within a particular application (e.g., managed by a computing device of the collaborative system), a number of selections associated with the particular application, a series of accessing different applications while performing a service, a time the agent spends in the particular application, a time associated with each selection in the particular application, a time between selections, a total time associated with performing the service, and the like.

In various examples, the event data may include real-time and/or near real-time data associated with user interaction with the user interface. In such examples, responsive to receiving the indication of the fault, the IM computing device(s) 102 may access the event data to determine real-time or near real-time interactions. In some examples, the event data may include stored data corresponding to a previous user interaction with the user interface. In some examples, the IM computing device(s) 102 may receive the indication of the fault and may access the event data corresponding to previous user interactions with the user interface.

At operation 606, the process 600 includes determining whether the fault can be remedied by alternate user inputs. In examples in which the fault is associated with hardware, software, and the like, the fault may not be remedied by alternate user inputs. In examples in which the fault is associated with inefficiency corresponding to user interaction with a user interface, the fault may be remedied by alternate user inputs.

Based on a determination that the fault may be remedied by alternate user inputs ("Yes" at operation 606), the process 600, at operation 608, includes identifying a first action for the user to perform. The first action may represent an alternate user input configured to remedy the fault. The first action may include a series of user inputs associated with the user interface (e.g., alternate order of selections, etc.) and/or a particular application, a series of applications accessed to perform a service (e.g., alternate order of accessing applications), a suggested user input corresponding to a function of the user interface (e.g., input wildcard symbol associated with search function), and/or other actions designed to remedy the fault associated with user interactions with a user interface, as described herein.

At operation 610, the process 600 includes causing a notification including the first action to be presented on a display associated with the user computing device. The notification may include a push notification, electronic mail, short message system message, or other notification system configured to alert a person of the fault and/or the action. In some examples, the notification may be displayed in association with the user interface. In some examples, the notification may additionally include the fault associated with the at least one of the first action.

Based on a determination that the fault may not be remedied by alternate user inputs ("No" at operation 606), the process 600, at operation 612, includes identifying a second action to take to remedy the fault. The second action may include network routing modifications, infrastructure modifications and/or optimization (e.g., adding resources, deleting resources, etc.), resource adaptation and optimization (e.g., modifying an application, modifying an application programming interface, etc.), computing system preventative health assessments, capacity planning (e.g., memory, adoption rates, etc.), and/or other actions designed to remedy faults and/or prevent potential future faults.

In some examples, the second action may include sending a notification to an associated computing device to alert a system manager of the fault and/or the potential future fault. In some examples, the notification may include a push notification, electronic mail, short message system message, or other notification system configured to alert a person of the fault with the computing system. For example, the IM computing device(s) 102 may determine that an external application (e.g., not associated with an organization of the IM computing device(s) 102) managed by a third-party computing device 110 has associated therewith an application error. The IM computing device(s) 102 may send a notification alerting a third-party resource of the application error.

At operation 614, the process 600 includes automatically performing the second action or causing another user to perform the second action. In various examples, the IM computing device(s) 102 may be configured to automatically perform the second action based on a determination thereof. In such examples, the IM computing device(s) 102 may be configured to remedy the fault and/or cause another computing device of the collaborative system to remedy the fault. In some examples, the other user may perform the second action to remedy the detected fault. The user and the other user may be the same or a different person. For example, the other user may be a user that is responsible for information technology assets associated with a particular agent office, such that the other user has administrative rights to perform the second action to remedy the fault.

Figure 7:
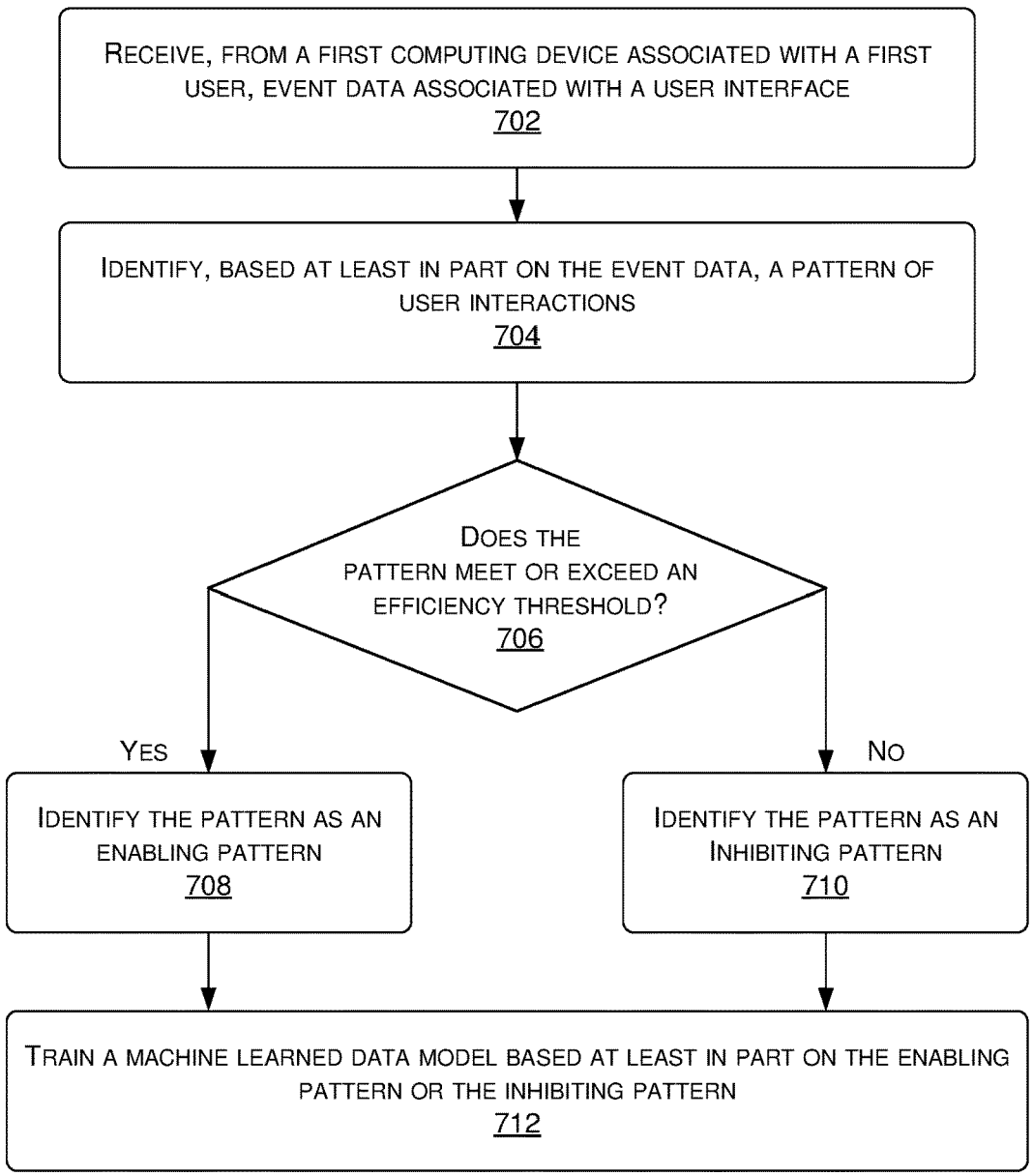
FIG. 7 is a flow diagram illustrating an example process for identifying a pattern of user interactions with a user interface and training a machine learned data model based on the pattern.

FIG. 7 illustrates an example process 700 for training a data model to identify a fault or a potential future fault in a computing device associated with a collaborative system. In various examples, the process 700 is described with reference to the system 100 and may be performed by the IM computing device(s) 102 and/or in cooperation with any one or more of the agent computing device(s) 108, the enterprise computing device(s) 106, and/or the third-party computing device(s) 110. Of course, the process 700 may be performed in other similar and/or different environments.

At operation 702, the process 700 includes receiving, from a first computing device associated with a first user, event data associated with a user interface. In various examples, the user computing device may be an agent computing device and the user may be an agent associated with an organization. In at least one example, the user may include an agent associated with an organization configured to perform one or more services for a customer. In such an example, the services may include services related to insurance (e.g., automobile, life, property, small business etc.), banking (e.g., loans, savings, checking, etc.), and/or other services.

In various examples, the event data may include user interactions with the user interface. In such examples, the event data may include selections (e.g., clicks), inputs, times associated with inputs (e.g., time between clicks, etc.) navigation history (e.g., between applications, within an application, etc.), login history, time to perform a service and/or function, number of iterations of performing a same function, and/or any other interaction with an application via the user interface.

In various examples, the IM computing device(s) 102 may determine a collection of event data. The collection of event data may include event data related to or associated with user interactions corresponding to the user performing a particular service and/or function. In various examples, the collection of event data may be associated with a particular session of user interaction associated with the particular service and/or function. The collection of event data may be determined based on a time associated with the user interaction (e.g., time between user selections exceeds a maximum time), an indication that the service or function is complete, a logout event, or any other indication to denote a break in related user selections.

At operation 704, the process 700 includes identifying, based at least in part on the event data, a pattern of user interactions. The pattern may be identified in a collection of event data, such as event data associated with a session of user interaction, a task, function and/or service performed for a customer. In some examples, the pattern may include a sequence of user inputs via the user interface, a total number of user inputs, a time between user inputs, a number and sequence of transitions between applications, and the like. The patterns may be identified by using statistical analysis and data mining techniques.

At operation 706, the process 700 includes determining whether the pattern meets or exceeds an efficiency threshold. In some example, the efficiency threshold may be determined based on the optimized pattern of user interaction. For example, the threshold score may represent 80% of the optimized pattern (e.g., a speed and/or efficiency equivalent to the $80^{th}$ percentile).

In various examples, the IM computing device(s) 102 may determine one or more efficiency scores associated with the pattern of user interactions. In at least one example, the efficiency score(s) may be determined utilizing machine learning techniques. In some examples, the efficiency score(s) may be determined based on a comparison to an optimized pattern of user interaction. In such examples, the IM computing device(s) may compare the current event data with event data corresponding to a same or similar user interaction that is determined to be optimally performed (e.g., fastest time to complete a task, function, or service, least time between clicks, etc.). In some examples, the efficiency score can be determined based on historical data associated with user interactions with a plurality of agent devices (e.g., a plurality of data received from the plurality of agent devices). In such examples, the IM computing device(s) 102 can compare user interactions with previous user interactions to determine the efficiency score(s).

Based on a determination that the pattern meets or exceeds the efficiency threshold ("Yes" at operation 706), the process, at operation 708, includes identifying the pattern as an enabling pattern. The enabling pattern may include patterns of user interactions that represent efficient operations with respect to the user interface and/or an application e.g., patterns that meet or exceed a threshold level of performance with the application or the user interface.

Based on a determination that the pattern does not meet or exceed the efficiency threshold ("No" at operation 706), the process, at operation 710, includes identifying the pattern as an inhibiting pattern. The inhibiting patterns may include patterns of user interactions that represent inefficient operations with respect to the user interface and/or the application e.g., patterns that reach lower levels of performance than a threshold level.

At operation 712, the process 700 includes training a machine learned data model based at least in part on the enabling pattern or the inhibiting pattern. The enabling patterns may be used as positive examples in a supervised learning system, whereas inhibiting patterns may be used as negative examples. The machine learned data model may be used to identify a fault and/or identify an action in response to a detected fault. In some examples, the event data may be used as training data to train the machine learned data model, such as data model 124.

Figure 8:
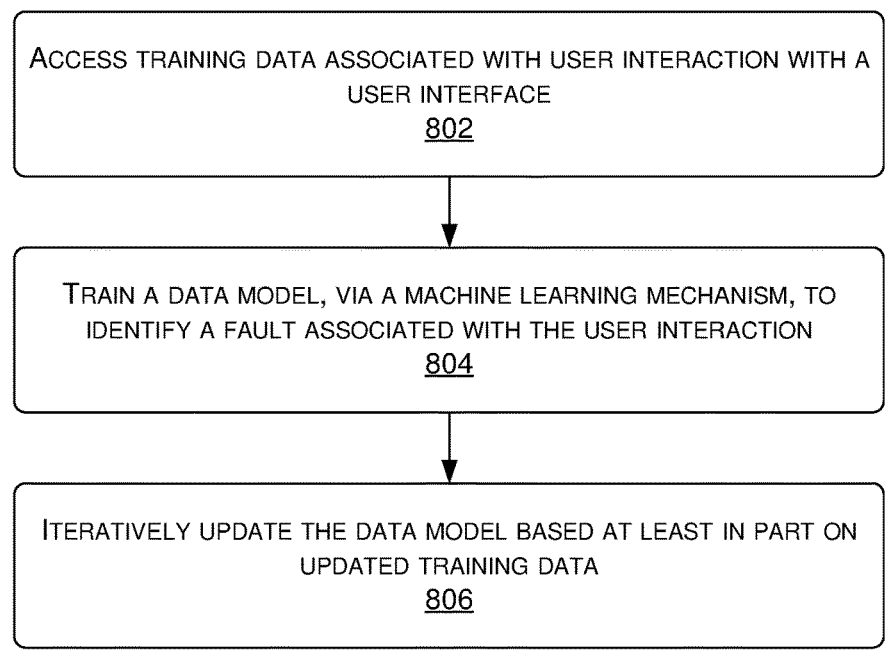
FIG. 8 is a flow diagram illustrating an example process for training a data model to identify a pattern associated with user interaction with a user interface.

FIG. 8 illustrates an example process 800 for training a data model to identify a fault associated with user interaction with a user interface. In various examples, the process 800 is described with reference to the system 100 and may be performed by the IM computing device(s) 102 and/or in cooperation with any one or more of the agent computing device(s) 108, the enterprise computing devices 106, and/or the third-party computing devices 110. Of course, the process 800 may be performed in other similar and/or different environments.

At operation 802, the process 800 includes accessing training data associated with user interaction with a user interface. The training data may include data associated with a plurality of users (e.g., agents) interacting with user interfaces associated with a plurality of user computing devices (e.g., agent devices 108). As discussed above, a training component of the IM computing device(s) may train one or more data models leveraging machine learning mechanisms. In at least one example, the training component may access training data. In some examples, the training data can include event data associated with a plurality of user interactions with a plurality of user interfaces. In such examples, the plurality of user interfaces may be associated with a plurality of user devices (e.g., agent devices). In various examples, the plurality of user interactions may include a plurality of collections of event data. In such examples, each of the plurality of user interactions may be associated with a session of user interaction with the user interface, such as associated with the user performing a task, function, and/or service for a customer.

In some examples, the training data may include one or more enabling patterns and one or more inhibiting patterns of user interactions with the user interface. In various examples, the enabling pattern(s) and the inhibiting pattern(s) can be associated with a particular task, function, and/or service performed by the agent, such as for a customer. In some examples, the training data may include an optimized pattern of user interactions. In such examples, the training data may include a most efficient, fastest, most productive pattern of user interactions with the user interface. The optimized pattern of user interactions may be associated with the particular task, function, and/or service performed by the agent.

At operation 804, the process 800 includes training a data model, via a machine learning mechanism, to identify a fault associated with the user interaction. The fault may represent an inefficiency associated with user interaction with the user interface. In some examples, the fault may be associated with a particular task, function, and/or service performed by the agent. In such examples, the fault may be associated with a session associated with the particular task, function, and/or service performed by the agent. The training data may include event data, such as selections (e.g., clicks), a series (e.g., order) of selections within a particular application (e.g., managed by a computing device of the collaborative system), a number of selections associated with the particular application, a series of accessing different applications while performing a service, a time the agent spends in the particular application, a time associated with each selection in the particular application, a time between selections, a total time associated with performing the service, and the like. The training data may also include an indication of a detected fault, which may be used for supervised learning algorithms. The training component may train the data model based on a plurality of training data items such that, given a new input of user interactions, the data model may output a fault associated therewith. In some examples, the training component may train the data model based on the plurality of training data items such that given event data associated with a user interaction with the user interface, the data model may output an efficiency score associated therewith. The efficiency score may be determined based on event data corresponding to an optimized pattern of user inputs, an average pattern, or the like.

In at least one example, the training component may utilize a machine learning mechanism to train the data model. In such an example, the data model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In some examples, the training component may utilize one or more statistical models to train the data model.

At operation 806, the process 800 includes iteratively updating the data model based at least in part on updated training data. In at least one example, the training component may receive updated training data. For instance, the training component may receive updated training data after a lapse of a predetermined period of time, at a particular frequency, etc. The updated training data may include updated event data including additional user interactions with the user interface.

Figure 9:
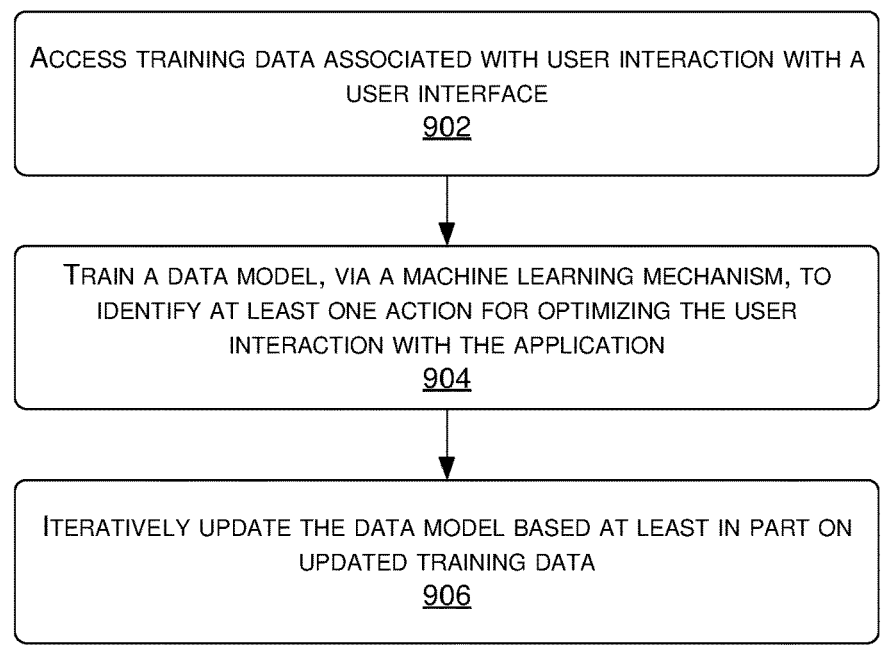
FIG. 9 is a flow diagram illustrating an example process for training a data model to identify an action for optimizing user interaction with a user interface.

FIG. 9 illustrates an example process 900 for training a data model to identify an action for optimizing user interaction with a user interface. In various examples, the process 900 is described with reference to the system 100 and may be performed by the IM computing device(s) 102 and/or in cooperation with any one or more of the agent computing device(s) 108, the enterprise computing device(s) 106, and/or the third-party computing device(s) 110. Of course, the process 900 may be performed in other similar and/or different environments.

At operation 902, the process 900 includes accessing training data associated with user interactions with a user interface. The training data may include data associated with a plurality of users (e.g., agents) interacting with user interfaces associated with a plurality of user computing devices (e.g., agent devices 108). As discussed above, a training component of the IM computing device(s) may train one or more data models leveraging machine learning mechanisms. In at least one example, the training component may access training data. The training data may include event data, such as selections (e.g., clicks), a series (e.g., order) of selections within a particular application (e.g., managed by a computing device of the collaborative system), a number of selections associated with the particular application, a series of accessing different applications while performing a service, a time the agent spends in the particular application, a time associated with each selection in the particular application, a time between selections, a total time associated with performing the service, and the like. The training data may also include an indication of a detected fault, action(s) that were recommended in response, and results of the action(s) e.g., whether the agent performed the action(s), a success and/or failure of the action(s) to improve efficiency or remedy the fault.

At operation 904, the process 900 includes training a data model, via a machine learning mechanism, to identify at least one action for optimizing the user interaction with the application. The training component may train the data model based on a plurality of training data items such that, given a new input of event data corresponding to user interaction with a user interface, the data model may output an action to optimize the user interaction of the user. In some examples, the training component may train the data model based on the plurality of training data to output a determination of an action to perform to remedy a fault associated with the user interaction.

In at least one example, the training component may utilize a machine learning mechanism to train the data model. In such an example, the data model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In some examples, the training component may utilize one or more statistical models to train the data model.

At operation 906, the process 800 includes iteratively updating the data model based at least in part on updated training data. In at least one example, the training component may receive updated training data. For instance, the training component may receive updated training data after a lapse of a predetermined period of time, at a particular frequency, etc. The updated training data may include updated network characteristics, faults determined, one or more actions taken to remedy the faults, and/or efficacy data associated with the action(s).

Implementations of the techniques and systems described herein can improve existing technologies and can improve the functioning of a user computing device (e.g., agent device) associated with a collaborative system. In particular, the implementations described herein provide a system for detecting inefficiencies associated with a user interaction with a user interface and providing a recommended action for a user to take to improve efficiency.

Unlike conventional systems, the intelligent user interface monitoring and alert system described herein may monitor user interactions with a user interface. The user interactions may include user interactions with the computing device itself, one or more native applications, and/or one or more web-based applications. In some examples, the application(s) may be controlled (e.g., managed by a third-party service provider and accessible via a network. The intelligent user interface monitoring and alert system may be configured to determine one or more faults (e.g., inefficiencies) in the user interactions and action(s) to perform to remedy the fault(s). In some examples, the action may increase an efficiency of the user interactions with the user interface, thereby reducing a total time associated with the user interaction while performing a particular task, function, or service for a customer. In such examples, the techniques described herein may render available additional processing power and/or memory of the user computing device, such as for other functions thereof.

In some examples, the actions may result in less data being transmitted between the user device and one or more other devices (e.g., associated with an application). For example, by increasing an efficiency of user interactions between a user computing device and a web-based application, the user may utilize a reduced amount of network bandwidth to perform a particular task, function, and/or service for a customer. In some examples, the reduction in data may improve an amount of data available for other data to be transmitted via the network.

As a further example, variations of apparatus or process limitations (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

It should be appreciated that the subject matter presented herein can be implemented as a computer process, a computer-controlled apparatus, a computing system, or an article of manufacture, such as a computer-readable storage medium. While the subject matter described herein is presented in the general context of program components that execute on one or more computing devices, those skilled in the art will recognize that other implementations can be performed in combination with other types of program components. Generally, program components include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program components can be located in both local and remote memory storage devices.

What is claimed is:

1. A computing system comprising:
one or more processors; and
one or more computer-readable media storing instructions which, when executed by the one or more processors, cause the one or more processors to:
receive, from a computing device associated with a user, event data corresponding to a user interaction with a user interface of the computing device;
determine an efficiency score based on the event data;
determine that the efficiency score is less than a threshold score;
determine, based on determining that the efficiency score is less than the threshold score, a fault corresponding to the user interaction with the user interface;
determine an action for the user to perform based at least in part on the fault; and
cause a notification identifying the action to be presented on a display associated with the computing device.

2. The computing system of claim 1, wherein the instructions further cause the one or more processors to:
receive, from a plurality of computing devices, a plurality of event data corresponding to user interactions with respective user interfaces of the plurality of computing devices;
determine a first pattern associated with first event data of the plurality of event data and a second pattern associated with second event data of the plurality of event data;
determine that a first efficiency score associated with the first pattern is greater than a second efficiency score associated with the second pattern; and
identify the first pattern as an enabling pattern, the enabling pattern being an efficient pattern corresponding to the user interactions,
wherein the action is determined based at least in part on the enabling pattern.

3. The computing system of claim 1, wherein the efficiency score is based at least in part on at least one of:
a time between a first user input via the user interface and a second user input via the user interface;
a number of user inputs associated with the event data;
a total time associated with the event data;
a series of the user inputs associated with the event data;
a number of applications accessed in association with the event data; or
a number of the user inputs corresponding to a function of the user interface.

4. The computing system of claim 1, wherein the instructions further cause the one or more processors to:
determine that the fault is associated with an application of a plurality of applications corresponding to the event data,
wherein the action is determined based at least in part on the application.

5. The computing system of claim 1, wherein the instructions further cause the one or more processors to:
store the event data in a database;
determine an error associated with a collaborative computing system, wherein the error comprises at least one of a computer or network related issue that delays or prevents transmission of data between computing devices of the collaborative computing system;
determine that the error is based at least in part on the user interaction with the user interface; and
access the event data stored in the database to determine the fault.

6. The computing system of claim 1, wherein the instructions further cause the one or more processors to:
identify a user associated with the computing device; and
store the event data in association with a user profile corresponding to the user.

7. The computing system of claim 1, wherein at least one of the fault or the action is determined based at least in part on machine learning techniques.

8. A method, comprising:
receiving, from a computing device associated with a user, event data corresponding to a user interaction with a user interface of the computing device;
determining an efficiency score associated with the event data;
determining that the efficiency score based on the event data is less than a threshold score;
determining, based on determining that the efficiency score is less than the threshold score, a fault corresponding to the user interaction with the user interface;
determining an action for the user to perform based at least in part on the fault; and
causing a notification identifying the action to be presented on a display associated with the computing device.

9. The method of claim 8, further comprising:
receiving, from a plurality of computing devices, a plurality of event data corresponding to user interactions with respective user interfaces of the plurality of computing devices;

determining a first pattern associated with first event data of the plurality of event data and a second pattern associated with second event data of the plurality of event data;

determining that a first efficiency score associated with the first pattern is greater than a second efficiency score associated with the second pattern; and identifying the first pattern as an enabling pattern, the enabling pattern being an efficient pattern corresponding to the user interactions, wherein the action is determined based at least in part on the enabling pattern.

10. The method of claim 8, further comprising determining a pattern of user inputs associated with the user interface, wherein the pattern comprises at least one of:

a series of the user inputs via the user interface;

a total number of the user inputs received via the user interface and in association with the event data;

a time between a first user input and a second user input of the user inputs;

a total time associated with the event data;

a number of applications accessed in association with the event data;

a series of the applications accessed in associated with the event data; or a number of the user inputs corresponding to a function of the user interface.

11. The method of claim 10, wherein the efficiency score is based at least in part on the pattern of the user inputs.

12. The method of claim 8, wherein the action comprises at least one of:

a series of user inputs associated with the user interface;

a series of applications of a plurality of applications to access; or a suggested user input corresponding to a function of the user interface.

13. The method of claim 8, further comprising:

determining that the fault is associated with an application of a plurality of applications corresponding to the event data, wherein the action is determined based at least in part on the application.

14. The method of claim 8, further comprising:

identifying a user associated with the computing device; and storing the event data in association with a user profile corresponding to the user.

15. A non-transitory computer-readable medium storing instructions which, when executed by one or more processors, cause the one or more processors to:

receive, from a computing device associated with a user, event data corresponding to user interactions with a user interface of the computing device;

identify, based at least in part on the event data, a fault corresponding to the user interactions with the user interface;

determine that the fault is associated with a first user interaction of the user interactions, the first user interaction being with an application of a plurality of applications associated with the user interface;

determine an action for the user to perform in association with the application based at least in part on the fault; and cause a notification identifying the action to be presented on a display associated with the computing device.

16. The non-transitory computer-readable medium as claim 15 recites, wherein the instructions further cause the one or more processors to:

receive, from a plurality of computing devices, a plurality of event data corresponding to user interactions with respective user interfaces of the plurality of computing devices;

determine a first pattern associated with first event data of the plurality of event data and a second pattern associated with second event data of the plurality of event data;

determine that a first efficiency score associated with the first pattern is greater than a second efficiency score associated with the second pattern; and identify the first pattern as an enabling pattern, the enabling pattern being an efficient pattern corresponding to the user interactions, wherein the action is determined based at least in part on the enabling pattern.

17. The non-transitory computer-readable medium as claim 15 recites, wherein identifying the fault comprises:

determining an efficiency score based on the event data corresponding to the first user interaction with the application, the efficiency score being based at least in part on at least one of:

a time between a first user input of the first user interaction and a second user input of the first user interaction;

a number of user inputs associated with the application;

a total time associated with the first user interaction; or a series of the user inputs corresponding to the first user interaction; and determining that the efficiency score is less than a threshold score, wherein the fault is identified based on determining that the efficiency score is less than the threshold score.

18. The non-transitory computer-readable medium as claim 15 recites, wherein the action comprises at least one of:

a series of user inputs associated with the application;

a series of applications of a plurality of applications to access; or a suggested user input corresponding to a function of the application.

19. The non-transitory computer-readable medium as claim 15 recites, wherein the instructions further cause the one or more processors to:

determine a pattern of user inputs corresponding to the first user interaction, wherein the pattern comprises at least one of:

a series of the user inputs via the user interface during the first user interaction;

a total number of the user inputs received via the user interface and in association with the first user interaction;

a time between a first user input and a second user input of the user inputs;

a total time associated with the first user interaction;

a series of the applications accessed in associated with the event data; or a number of the user inputs corresponding to a function of the application.

20. The non-transitory computer-readable medium as claim 15 recites, wherein at least one of the fault or the action is determined based at least in part on machine learning techniques.

* * * * *